US006938854B2

(12) United States Patent
Nelson

(10) Patent No.: US 6,938,854 B2
(45) Date of Patent: Sep. 6, 2005

(54) INTEGRATED AND/OR MODULAR HIGH-SPEED AIRCRAFT

(75) Inventor: Chester P. Nelson, Kirkland, WA (US)

(73) Assignee: The Boeing Company, Seattle, WA (US)

( * ) Notice: Subject to any disclaimer, the term of this patent is extended or adjusted under 35 U.S.C. 154(b) by 3 days.

(21) Appl. No.: 10/394,550

(22) Filed: Mar. 21, 2003

(65) Prior Publication Data

US 2004/0016845 A1 Jan. 29, 2004

Related U.S. Application Data

(62) Division of application No. 09/815,390, filed on Mar. 22, 2001, now Pat. No. 6,575,406.
(60) Provisional application No. 60/264,224, filed on Jan. 19, 2001, and provisional application No. 60/264,225, filed on Jan. 19, 2001.

(51) Int. Cl.[7] .............................................. B64D 27/00
(52) U.S. Cl. .............................. 244/12; 54/55; 54/53 B
(58) Field of Search ........................... 244/15, 53 R–55, 244/36

(56) References Cited

U.S. PATENT DOCUMENTS

| | | | |
|---|---|---|---|
| 2,604,276 A | 7/1952 | Huben | |
| 2,846,165 A | 8/1958 | Axelson | |
| 2,941,752 A | 6/1960 | Gluhareff | |
| 3,109,610 A | 11/1963 | Quenzler et al. | |
| 3,132,827 A | * | 5/1964 | Roy et al. ...................... 244/53 |

(Continued)

FOREIGN PATENT DOCUMENTS

EP 000547266 A1 6/1993

WO WO82/00048 1/1982

OTHER PUBLICATIONS

The Boeing B–2, as shown in the B–2 Spirit which has an inlet in the upper surface.*
International Search Report for International Application No. PCT/US02/01567, The Boeing Company, Dec. 12, 2002 (5 pages).
U.S. Appl. No. 09/822,962, filed Mar. 30, 2001, Balzer.
U.S. Appl. No. 09/816,985, filed Mar. 23, 2001, Seidel.
U.S. Appl. No. 09/671,870, filed Sep. 27, 2000, Clark.
Scott, William B., "YF–23A Previews Design Features of Future Fighters," Aviation Week & Space Technology, Jul. 2, 1990.
"Photos Show Key Features of YF–23A ATF," Aviation Week & Space Technology, Jul. 9, 1990.
Dryden Flight Research Center, Feb. 1998.

(Continued)

*Primary Examiner*—Galen Barefoot
(74) *Attorney, Agent, or Firm*—Perkins Coie LLP

(57) ABSTRACT

An integrated and/or modular high-speed aircraft and method of design and manufacture. The aircraft can have a supersonic or near-sonic cruise Mach number. In one embodiment, the aircraft can include an aft body integrated with a delta wing and a rearwardly tapering fuselage to define a smooth forward-to-rear area distribution. A propulsion system, including an engine, inlet, and exhaust nozzle can be integrated into the aft body to be at least partially hidden behind the wing. In one embodiment, the entrance of the inlet can be positioned beneath the wing, and the exit of the nozzle can be positioned at or above the wing. An S-shaped inlet duct can deliver air to the aft-mounted, integrated engine. The aircraft can include aft-mounted elevators, wing-mounted elevons, and forward-mounted canards for pitch control. The construction of the aircraft can be modular to take advantage of commonalties between near-sonic and supersonic structures.

33 Claims, 19 Drawing Sheets

U.S. PATENT DOCUMENTS

| | | | |
|---|---|---|---|
| 3,237,891 A | | 3/1966 | Wotton |
| 3,430,640 A | * | 3/1969 | Lennard ............... 137/15.1 |
| 3,447,761 A | * | 6/1969 | Whitener et al. ............ 244/15 |
| 3,493,198 A | | 2/1970 | Roed |
| 3,576,300 A | * | 4/1971 | Palfreyman ............. 244/55 |
| 3,592,415 A | | 7/1971 | Walley et al. |
| 3,680,816 A | | 8/1972 | Mello |
| 3,738,595 A | | 6/1973 | Bouchnik |
| 3,900,178 A | | 8/1975 | Tupolev et al. |
| 3,940,097 A | | 2/1976 | Wilson et al. |
| 3,941,336 A | * | 3/1976 | Nangia ................ 244/53 B |
| 3,948,469 A | | 4/1976 | Brown |
| 3,954,231 A | | 5/1976 | Fraser |
| 4,008,867 A | | 2/1977 | Kaniut |
| 4,026,500 A | | 5/1977 | Grow |
| 4,116,405 A | | 9/1978 | Bacchi et al. |
| 4,378,097 A | | 3/1983 | Ferguson et al. |
| 4,478,377 A | | 10/1984 | Fletcher et al. |
| 4,478,378 A | | 10/1984 | Capuani |
| 4,579,300 A | | 4/1986 | Carr |
| 4,767,083 A | | 8/1988 | Koenig et al. |
| 4,828,204 A | * | 5/1989 | Friebel ................... 244/15 |
| 4,899,958 A | * | 2/1990 | Horikawa ............. 244/53 B |
| 4,969,614 A | | 11/1990 | Capuani |
| 4,979,699 A | | 12/1990 | Tindell |
| D314,366 S | | 2/1991 | Waaland et al. |
| D317,003 S | | 5/1991 | Tribe et al. |
| 5,167,383 A | | 12/1992 | Nozaki |
| 5,170,964 A | | 12/1992 | Enderle et al. |
| 5,209,428 A | | 5/1993 | Bevilaqua et al. |
| 5,216,879 A | | 6/1993 | Zysmaan |
| 5,299,760 A | | 4/1994 | Finch et al. |
| 5,322,242 A | | 6/1994 | Tracy |
| 5,496,001 A | | 3/1996 | Skow |
| 5,529,263 A | | 6/1996 | Rudolph |
| 5,542,625 A | | 8/1996 | Burhans et al. |
| RE35,387 E | | 12/1996 | Strom |
| D377,326 S | | 1/1997 | Grossman et al. |
| D381,938 S | | 8/1997 | Grossman et al. |
| D381,952 S | | 8/1997 | Carter, Jr. |
| D382,851 S | | 8/1997 | Knutson et al. |
| D386,143 S | | 11/1997 | Astaire |
| 5,749,542 A | | 5/1998 | Hamstra et al. |
| D399,816 S | | 10/1998 | Peacock |
| 5,842,666 A | * | 12/1998 | Gerhardt et al. ........... 244/15 |
| 5,897,076 A | | 4/1999 | Tracy |
| 5,897,078 A | | 4/1999 | Burnham et al. |
| 5,906,334 A | | 5/1999 | Chamay et al. |
| 5,961,068 A | | 10/1999 | Wainfan et al. |
| D417,184 S | | 11/1999 | Hartmann et al. |
| 6,079,667 A | | 6/2000 | Gruensfelder |
| 6,092,360 A | | 7/2000 | Hoag |
| 6,138,957 A | | 10/2000 | Nastasi et al. |
| D437,284 S | | 2/2001 | Knutson et al. |
| D439,876 S | | 4/2001 | Simonov et al. |
| D453,014 S | | 1/2002 | Fraser |
| D467,533 S | | 12/2002 | Han |
| D471,854 S | | 3/2003 | Rouleau et al. |
| 6,575,406 B2 | | 6/2003 | Nelson |
| D477,561 S | | 7/2003 | Nelson |
| 6,634,595 B2 | * | 10/2003 | Koncsek et al. .......... 244/53 B |

OTHER PUBLICATIONS

Rockwell/MBB X31A (The date is unavailable, but the publication is earlier than effective U.S. filing date.

Taylor, Michael J.H., "Jane's Pocket Book of Research and Experimental Aircraft," North American XB–70A Valkyrie, Collier Books, New York, 1976.

Liebeck, R.H. et al., AIAA 98–0438, Blended–Wing–Body Subsonic Commercial Transport, 36th Aerospace Sciences, Meeting & Exhibit, Jan. 12–15, 1998, Reno, Nevada (pp. 1 and 4).

Capone, Francis, J. and Reubush, David E., "Effects of Varying Podded Nacelle–Nozzle Installations on Transonic Aeropropulsive Characteristics of a Supersonic Figher Aircraft," NASA Technical Paper 2120, 1983 (pp. 83 and 99).

Brennan, Heather, "Spotlight on . . . Daniel Raymer," AIAA Editorial Echoes Interview with Daniel Raymer, Spring 2000 htpp://www.aricraftdesign.com/spotlighton.html [Accessed Oct. 29, 2001].

Dan Raymer http://www.aircraftdesign.com/raymer.html [Accessed Oct. 29, 2001].

Aircraft Conceputal Design Drawings & Pictures http://www.aircraftdesign.com/acpix.html [Accessed Oct. 30, 2001].

"Rockwell/MBB X–31 Makes Second Flight Reaching 20,000–Ft. Altitude, Mach 0.6," Aviation Week & Space Techn., p. 117, Oct. 22, 1990.

Stinton, Darrol, "The Anatomy of the Aeroplane," Granada Publishing Limited, 1966 (pp. 27, 276, 274, 162).

Angelucci, Enzo, "World Encyclopedia of Civil Aircraft, from Leonardo da Vinci to the Present," Crown Publishers, Inc., New York, 1981 (p. 364).

Roskam, Jan, Dr., "Airplane Design Part II: Preliminary Configuration Design and Integration of the Propulsion System," Roskam Aviation and Engineering Corporation, Ottawa, Kansas, 1985 (pp. 76–78, 81).

Poisson–Quinton, Philippe, "Slender Wings for Civil and Military Aircraft," Twentieth Israel Annual Conference on Aviation and Astronautics, Feb. 22–23, 1978 (Title Page, p. 57, Figure 5).

NASA Technical Memorandum, "Proceedings of NASA Conference on Supersonic Transport Feasibility Studies and Supporting Research," Sep. 17, 1963 (Figure 45 only).

NASA Contractor Report 165934, "Large Payload Capacity SST Concepts—Technical and Economic Feasibility," Contract NAS1–16150, Jul. 1982.

International Search Report for International Application No. PCT/US01/02368, The Boeing Company, Aug. 28, 2001.

Prototypes: Comparative Design Analysis, Avaiation Week & Space Technology, Sep. 17, 1990.

* cited by examiner

| CHARACTERISTIC DATA TABLE | | | | |
|---|---|---|---|---|
| GEOMETRY | WING | VERT. TAIL | HORIZ. TAIL | CANARD |
| AREA – EFFECTIVE SQFT. | 8803.7 | 224.3 each | 305.6 | 316.0 |
| ASPECT RATIO | 3.089 | 1.792 | 4.40 | 4.356 |
| TAPER RATIO | 1.00 | 0.107 | 1.00 | 0.146 |
| SWEEP LE DEG. (TRAP) | 40.1 | 48.8 | 0.0 | 49.5 |
| DIHEDRAL – DEG. | 0 | 12.2 | 0 | 21.45 |
| ROOT CHORD (TRAP) – IN. | 1831.56 | 242.56 | 100.0 | 178.4 |
| TIP CHORD – IN. | 102.06 | 26.00 | 100.0 | 26.00 |
| M.A.C. – IN. (TRAP) | 1045.3 | 163.39 | 100.0 | 121.16 |
| SPAN – IN. | 1978.8 | 240.57 | 440.0 | 445.2 |
| TAIL ARM – IN. | – | 673.81 | 823.8 | 1635.6 |
*Fig. 14*
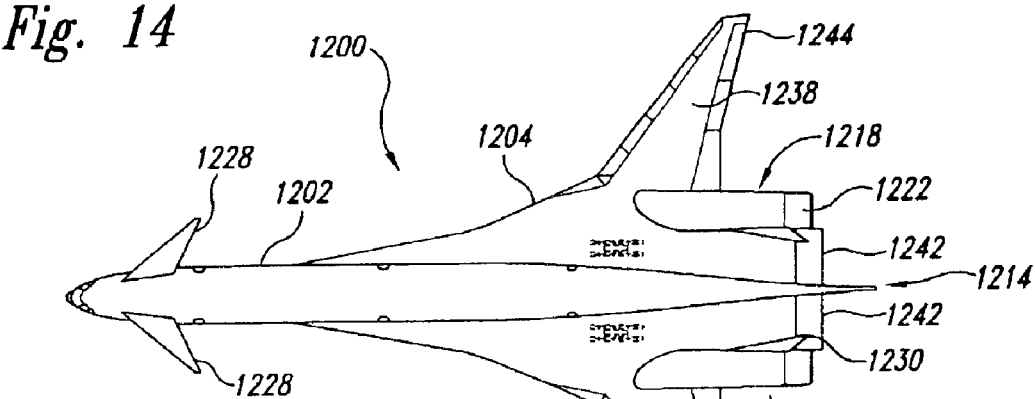
*Fig. 15A*
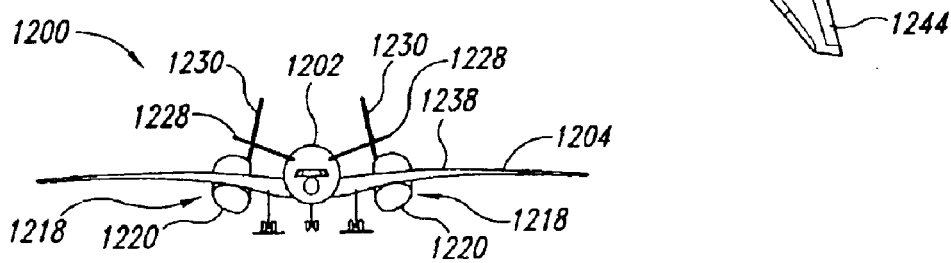
*Fig. 15B*
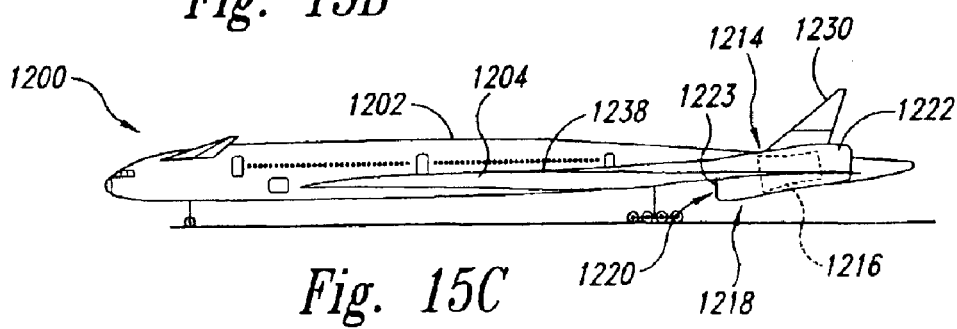
*Fig. 15C*

INTEGRATED AND/OR MODULAR HIGH-SPEED AIRCRAFT

CROSS-REFERENCE TO RELATED APPLICATIONS

This application is a divisional of U.S. patent application Ser. No. 09/815,390 filed Mar. 22, 2001 now U.S. Pat. No. 6,575,406, which application claims priority to U.S. Provisional Application No. 60/264,224 filed Jan. 19, 2001 and U.S. Provisional Application No. 60/264,225 filed Jan. 19, 2001, which applications are hereby incorporated by reference in their entireties.

TECHNICAL FIELD

The disclosed embodiments relate to highly integrated and/or modular high-speed aircraft configurations and methods for designing and manufacturing such configurations.

BACKGROUND

One goal of the commercial air transport industry is to convey passengers and cargo as quickly as possible from one point to another. Accordingly, many commercial transport aircraft operate at cruise Mach numbers of approximately 0.8–4.85. As the time constraints placed on air carriers and their customers increase, it would be advantageous to economically transport passengers and cargo at higher speeds. However, aircraft flying at transonic or supersonic speeds (greater than about Mach 0.85) have greater relative thrust requirements than comparably sized subsonic aircraft. To generate sufficient thrust at high altitudes and Mach numbers, while reducing the corresponding increase in drag, conventional transonic and supersonic aircraft include low bypass ratio turbofan engines or straight turbojet engines. Such configurations generally have a high specific fuel consumption at cruise conditions that generally outweighs any inherent advantage in aerodynamic efficiency, resulting in a net fuel efficiency significantly lower than that of lower speed aircraft. The low fuel efficiency can also result in increased atmospheric emissions.

Conventional transonic and supersonic aircraft generally operate at very high jet velocities to generate sufficient thrust for take-off, which can result in significant airport and community noise problems. One approach to reducing the noise is to lengthen the engine inlet and nozzle ducts, and to also integrate noise abatement treatments with the ducts. One drawback with this approach is that such treatments generally increase the weight of the propulsion system, which can increase the wing structural loads and the susceptibility of the aircraft to wing flutter. If the wings are thickened to increase their weight capacity, the wave drag of the aircraft will also tend to increase. The increased weight of the wings also increases the amount of fuel that must be carried by the aircraft, which in turn increases the weight of the structure to support the fuel, which in turn requires still more fuel. Accordingly, it can be difficult to develop an effective, efficient, environmentally acceptable aircraft that operates at transonic and/or supersonic Mach numbers.

FIGS. 1A and 1B illustrate top isometric and bottom isometric views, respectively, of a supersonic cruise aircraft 100a in accordance with the prior art. The aircraft 100a can include a fuselage 102a, delta wings 104a, a propulsion system 106a suspended from the wings 104a, and an aft-tailed pitch control arrangement 107. Alternatively, the aircraft 100a can include a tail-less or canard pitch arrangement. In either configuration, the longitudinal distribution of the exposed cross-sectional area of the aircraft, and the longitudinal distribution of the planform area tend to dominate the transonic and supersonic wave drag (i.e., the increase in drag experienced beyond about Mach 0.85 due to air compressibility effects). Accordingly, the fuselage 102a can be long, thin, and "area-ruled" to reduce the effects of wave drag at supersonic speeds.

Area-ruling the fuselage 102a can result in a fuselage mid-region that is narrower than the forward and aft portions of the fuselage (i.e., a "waisted" configuration). Waisting the fuselage can compensate for the increased cross-sectional area resulting from the presence of the wings 104a and the propulsion system 106a. The propulsion system 106a can include four engine nacelle pods 108a mounted beneath the wing 104a to minimize adverse aerodynamic interference drag and to separate the rotating machinery of the engines from the main wing spar and the fuel tanks located in the wing. Noise suppressor nozzles 110a are typically cantilevered well beyond a trailing edge 112a of the wing 104a, and can accordingly result in large cantilever loads on the wing 104a.

FIGS. 1C–E illustrate a side view, plan view and fuselage cross-sectional view, respectively, of a configuration for a high-speed transonic cruise transport aircraft 100b having a fuselage 102b, swept wings 104b, and engine nacelles 106b suspended from the wings 104b in accordance with prior art. The fuselage 102b has a significantly narrowed or waisted portion proximate to a wing/body junction 105. Accordingly, the fuselage 102b is configured to avoid or at least reduce increased drag in a manner generally similar to that described above with reference to FIGS. 1A and 1B. This configuration may suffer from several drawbacks, including increased structural weight, increased risk of flutter loads, and a reduced payload capacity. The configurations shown in FIGS. 1A–1E can be structurally inefficient and can have reduced payload capacities as a result of the fuselage waisting required to reduce transonic and supersonic drag.

SUMMARY

The present invention is directed toward high-speed aircraft and methods for aircraft manufacture. In one aspect of the invention, the aircraft can include a fuselage portion configured to carry a payload, and a wing portion depending from the fuselage portion. The wing portion can have a forward region with a leading edge, an aft region with a trailing edge, an upper surface, and a lower surface. The aircraft can further include a propulsion system at least proximate to the aft region of the wing portion, with at least part of the propulsion system positioned between the upper and lower surfaces of the wing portion. The propulsion system can include at least one inlet aperture positioned beneath the wing portion lower surface or above the wing portion upper surface, and at least one engine positioned aft of and vertically offset from, the at least one inlet aperture. The propulsion can further include at least one exhaust nozzle aft of the at least one engine. In a further aspect of the invention, the aircraft can further include at least one canard depending from the fuselage portion forward of the propulsion system. In another aspect of the invention, the fuselage portion can be elongated along a fuselage axis and the aircraft can include a pitch control surface having an aft trailing edge positioned inboard of the exhaust nozzle between the exhaust nozzle and the fuselage axis.

In still a further aspect of the invention, the propulsion system can include a rearwardly curving S-shaped duct between the inlet aperture and the engine. The aircraft can be configured to operate at a sustained cruise Mach number of from about 0.95 to about 0.99, or, alternatively, the aircraft can be configured to operate at a sustained cruise Mach number of from about 1.5 to about 3.0. The fuselage portion can include a forward region, an aft region adjacent to the propulsion system, and an intermediate region forward of the propulsion system between the forward and aft regions. The fuselage portion can taper continuously from the intermediate region to the aft region.

The invention is also directed to a modular aircraft system that can include a fuselage portion having a payload section, and a swept-wing portion depending from the fuselage portion and having an upper surface and a lower surface. The aircraft system can further include first and second nose portions interchangeably positionable on the fuselage portion, with the first nose portion being configured for subsonic flight up to about Mach 0.99 and the second nose portion being configured for supersonic flight. The system can further include first and second nacelles interchangeably coupleable to an aft part of the wing portion, with the first nacelle being configured for subsonic flight up to about Mach 0.99 and the second nacelle being configured for supersonic flight.

The invention is still further directed to a method for manufacturing an aircraft. In one aspect of the invention, the method can include attaching a wing portion to a fuselage portion with the wing portion having a forward region with a leading edge, an aft region with a trailing edge, an upper surface and a lower surface. The fuselage portion can be configured to carry a payload and can be elongated along a fuselage axis. The method can further include coupling a propulsion system to the wing portion by mounting the propulsion system to the aft region of the wing portion and positioning at least part of the propulsion system between the upper and lower surfaces of the wing portion. The propulsion system can include at least one inlet aperture positioned beneath the lower surface of the wing portion or above the upper surface of the wing portion, with the propulsion system further including at least one turbofan engine positioned aft and vertically offset from the at least one inlet aperture. The propulsion system can further include at least one exhaust nozzle aft of the at least one engine, and a generally S-shaped duct between the at least one engine and the at least one inlet aperture. The method can still further include positioning a pitch control surface between the propulsion system and the fuselage axis, or attaching a canard to the fuselage portion.

BRIEF DESCRIPTION OF THE DRAWINGS

FIG. 14 is a table listing representative data for a near-sonic transport aircraft in accordance with an embodiment of the invention.

FIGS. 15A–C are partially schematic, top, front, and side views of a near-sonic transport aircraft generally similar to that shown in FIGS. 12 and 13 in accordance with an embodiment of the invention.

DETAILED DESCRIPTION

Figure 1A:
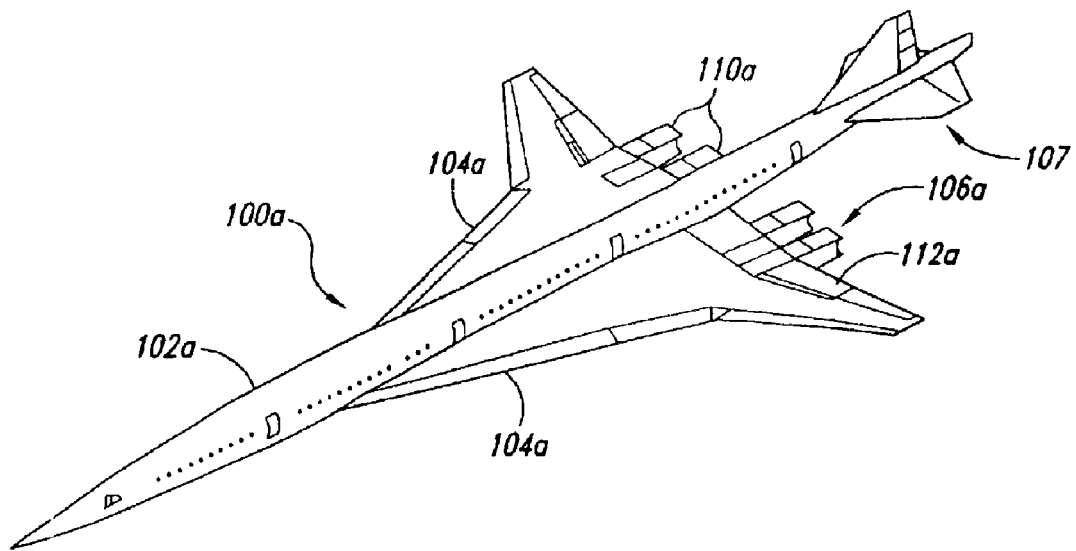
FIGS. 1A and 1B illustrate a supersonic transport aircraft configuration having a narrowed fuselage in accordance with the prior art.
Figure 1B:
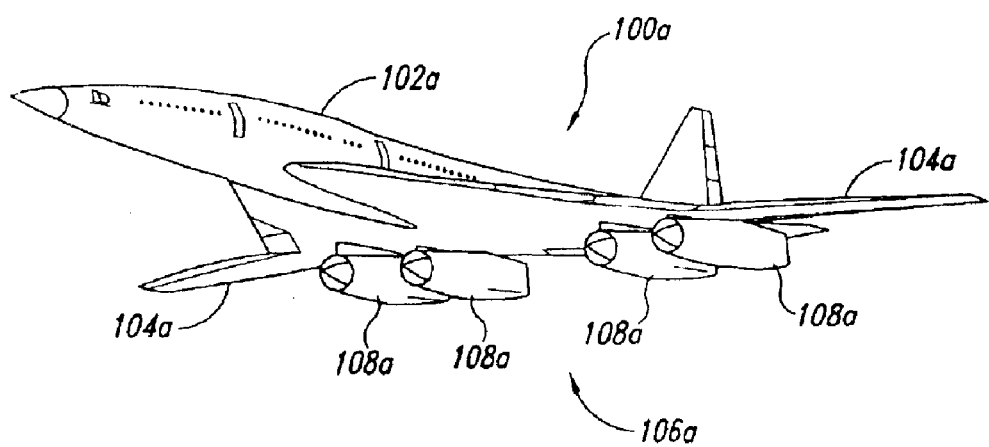
Figure 1C:
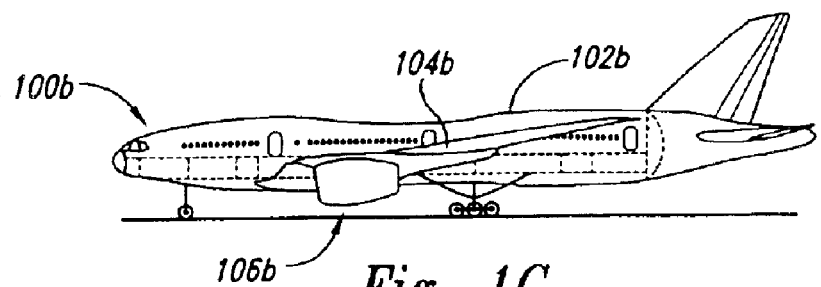
FIGS. 1C–E illustrate a subsonic/transonic transport aircraft having a narrowed fuselage in accordance with the prior art.
Figure 1D:
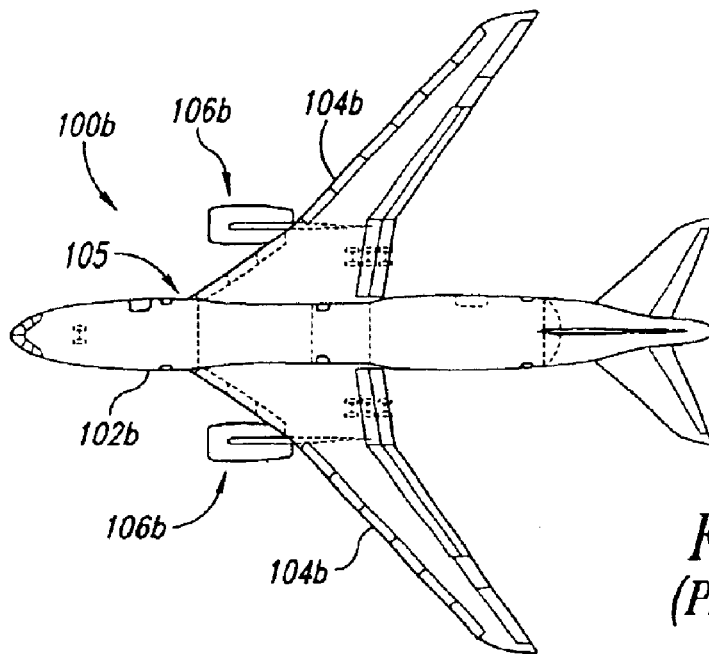
Figure 1E:
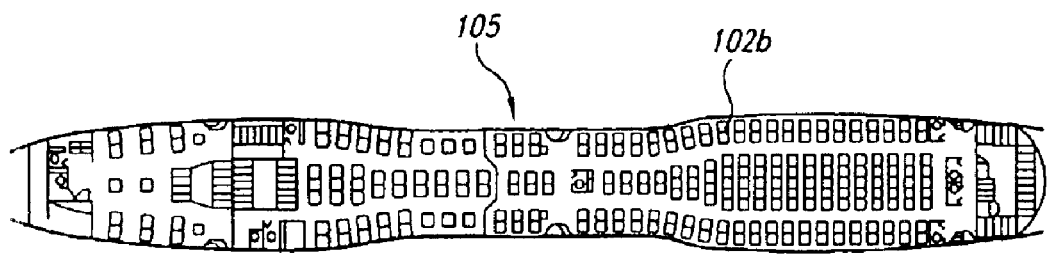

The following description provides specific details for a thorough understanding of, and enabling description for, embodiments of the invention. However, one skilled in the art will understand that the invention may be practiced without certain of these details. In some instances, well-known structures and functions have not been shown or described in detail to avoid unnecessarily obscuring the description of the embodiments of the invention.

In the drawings, identical reference numbers identify identical or substantially similar elements. To easily identify the discussion of any particular element, the most significant digit or digits in a reference number refer to the Figure number in which that element is first introduced (e.g. element 1202 is first introduced and discussed with reference to FIG. 12). Dimensions, angles and other specifications shown in the Figures are representative of particular embodiments of the invention. As such, configurations in accordance with other embodiments can have other specifications.

FIGS. 2–11C and the related description refer to supersonic aircraft having aft-mounted, integrated propulsion systems in accordance with embodiments of the invention. FIGS. 12–17A and the related description refer to near-sonic aircraft having aft-mounted, integrated propulsion systems in accordance with further embodiments of the invention. FIG. 17B and the related description refer generally to supersonic business jets having aft-mounted, integrated propulsion systems in accordance with still further embodiments of the invention. FIGS. 18–23 and the related description refer to components of integrated propulsion systems in accordance with still further embodiments of the invention. FIG. 24 and the related description refer to modular aircraft configurations in accordance with yet further embodiments of the invention.

Figure 2:
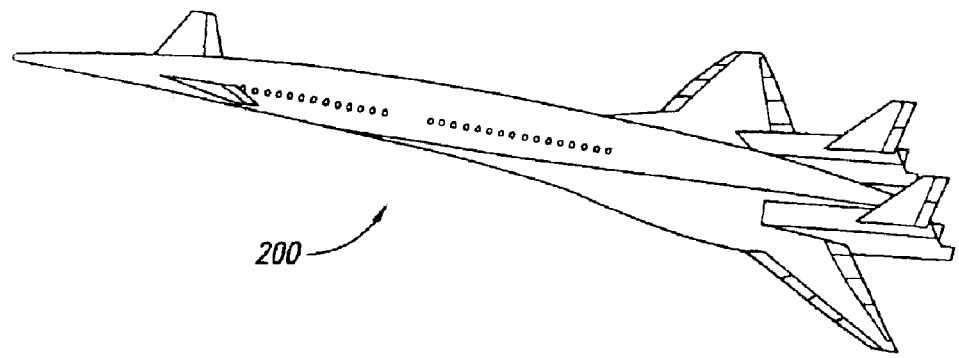
FIG. 2 is a partially schematic, side isometric view of a supersonic transport aircraft having an integrated propulsion system and aft body in accordance with an embodiment of the invention.

FIG. 2 is a partially schematic isometric view of a supersonic aircraft 200 having an integrated propulsion system and aft body in accordance with an embodiment of the invention. In one embodiment, the aircraft 200 can be configured to transport about 300 passengers at a cruise Mach number of about 2.4. In other embodiments, the aircraft 200 can have other payload capacities and other cruise Mach numbers, for example, a cruise Mach number of from about 1.5 to about 3.0.

Figure 3:
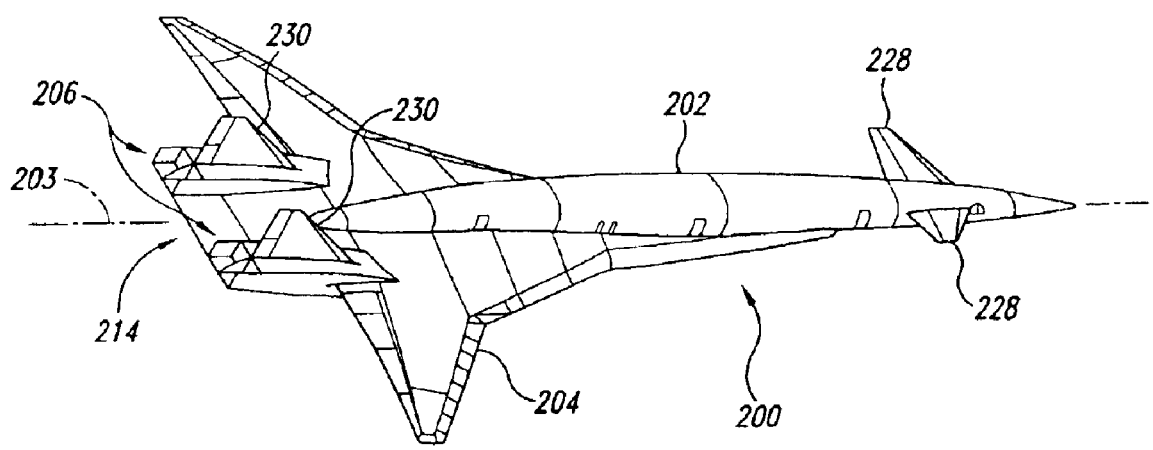
FIG. 3 is a partially schematic, rear isometric view of an aircraft generally similar to that shown in FIG. 2 in accordance with an embodiment of the invention.
Figure 4A:
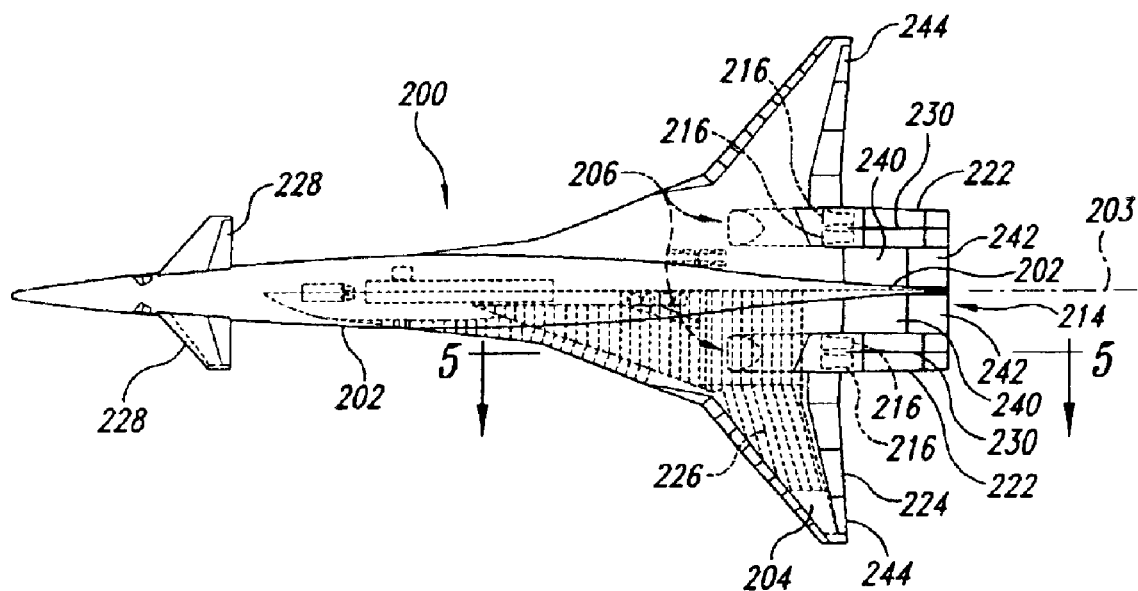
FIGS. 4A–C are partially schematic, top, front, and side views, respectively, of an aircraft generally similar to that shown in FIG. 2 in accordance with an embodiment of the invention.
Figure 4B:
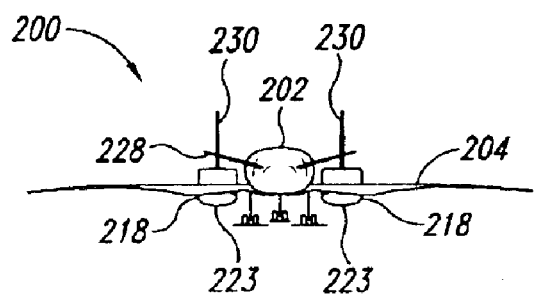
Figure 4C:
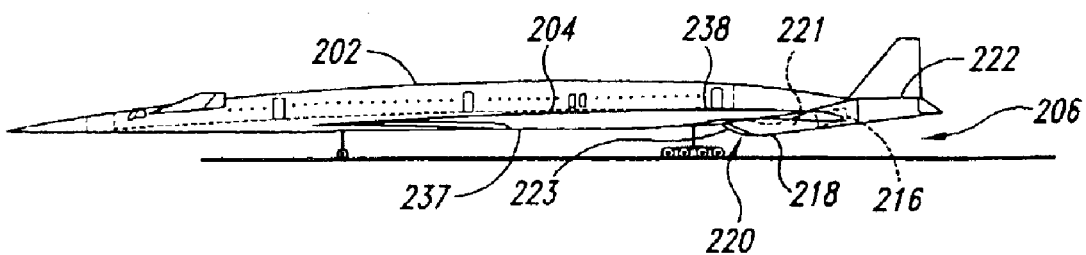

FIG. 3 is a partially schematic, top isometric view of an aircraft 200 generally similar to that shown in FIG. 2 but having a shortened fuselage 202. FIGS. 4A–C illustrate partially schematic, top, front, and side elevational views, respectively, of an aircraft 200 generally similar to that shown in FIG. 2. Referring now to FIGS. 3 and 4A–C, an embodiment of the aircraft 200 can include the fuselage 202 (elongated along a fuselage axis 203), a delta wing 204, and a propulsion system 206 integrated with an aft body 214. In one aspect of this embodiment (shown in FIG. 4B), the fuselage 202 can have a generally elliptical cross-sectional shape to more readily accommodate a twin-aisle seating configuration. In other embodiments, the fuselage 202 can have other shapes, such as a circular cross-sectional shape. In either embodiment, the fuselage 202 can taper continuously from a mid region to an aft region to improve the drag characteristics of the aircraft 200, as described in greater detail below. The wing 204 can have a generally delta-shaped configuration, such as a triple-delta configuration shown in FIGS. 3 and 4A. Alternatively, the wing 204 can have a single or double-delta configuration, or a continuously curved ogive or ogee configuration. The aircraft can further include forward-mounted, canted canards 228 and vertical tails 230. In other embodiments, the tails can have other configurations, as will be described in greater detail below with reference to FIGS. 8 and 9.

Referring now to FIGS. 4A–C, the propulsion system 206 can include engines 216 (FIG. 4A) positioned in relatively long nacelles 218 (FIG. 4C). In one aspect of this embodiment, each nacelle 218 can include an inlet 220 having an inlet aperture 223 positioned below a lower surface 237 of the wing 204 and an S-shaped inlet duct 221 coupling the inlet aperture 223 with the engine 216. The nacelles 218 can further include exhaust ducts or nozzles 222 positioned at or above the wing 204. In alternative embodiments, the inlet aperture 223 can be positioned above the wing 204, as described in greater detail below with reference to FIGS. 18 and 19. In a further aspect of an embodiment shown in FIGS. 4A–C, the inlets 220 and the exhaust nozzles 222 can be positioned well aft of conventional wing-mounted locations. For example, the inlet 220 can be positioned aft of the 30% wing chord location. The exhaust nozzles 222 can be positioned well aft of a trailing edge 224 (FIG. 4A) of the wing 204, and near or above the chord line of the wing at the trailing edge 224. The engines 216 can be positioned behind a main wing box 226, and can extend aft of the wing trailing edge 224 as described in greater detail below with reference to FIG. 5.

Figure 5:
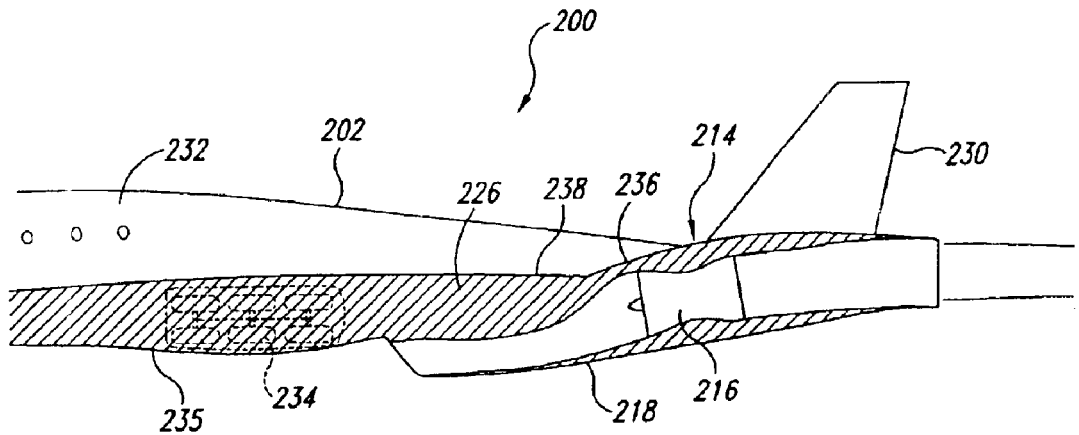
FIG. 5 is a partially schematic, cross-sectional side elevational view of a propulsion system integrated with an aircraft aft body in accordance with an embodiment of the invention.

FIG. 5 is a partially schematic, cross-sectional side elevational view of a rear portion of the aircraft 200 taken generally along line 5—5 of FIG. 4A. As shown in FIG. 5, the maximum cross-sectional area of the nacelle 218 can be positioned behind the main wing box 226 so that the nacelle 218 is at least partially hidden behind the front of the wing 204. At least a portion of the nacelle 218 and any rotating components of the engine 216 can also be positioned aft of the payload or cabin region 232 of the aircraft 200. For example, the rotating components of the engine (e.g., the fan blades, compressor blades, and turbine blades) can be positioned aft of the pressurized portion of the fuselage 202 to reduce the likelihood for cabin depressurization in the event that the rotating components fail. The rotating components of the engine 216 can also be positioned aft of any fuel in the wing 204 to reduce the likelihood for fire in the event the rotating components fail. In either embodiment, the engine 216 can be canted slightly downwardly as shown in FIG. 5 or, alternatively, the engine 216 can be approximately horizontal. In still another embodiment (for example, when the inlet is mounted above the wing, as described below with reference to FIGS. 18 and 19), the engine 216 can be canted upwardly.

In one aspect of an embodiment shown in FIG. 5, landing gear 234 can be stowed toward the rear of the cabin region 232 and forward of the nacelle 218. In a further aspect of this embodiment, a landing gear fairing 235 can be positioned to house the landing gear 234, and can be located in a region where the fuselage 202 is tapering, forward of the nacelle 218. Another fairing 236 can smoothly blend the upper portion of the nacelle 218 with an upper surface 238 of the wing 204.

In one aspect of this embodiment, the increase in the cross-sectional area created by the nacelle 218 (and, in one embodiment, the landing gear fairing 235) can coincide with a decrease in the cross-sectional area of the fuselage 202 to form a smooth total area distribution having a low net frontal area. Accordingly, this configuration can reduce the potential for a significant drag rise at near-sonic speeds when compared with configurations having other propulsion system locations.

Figure 6A:
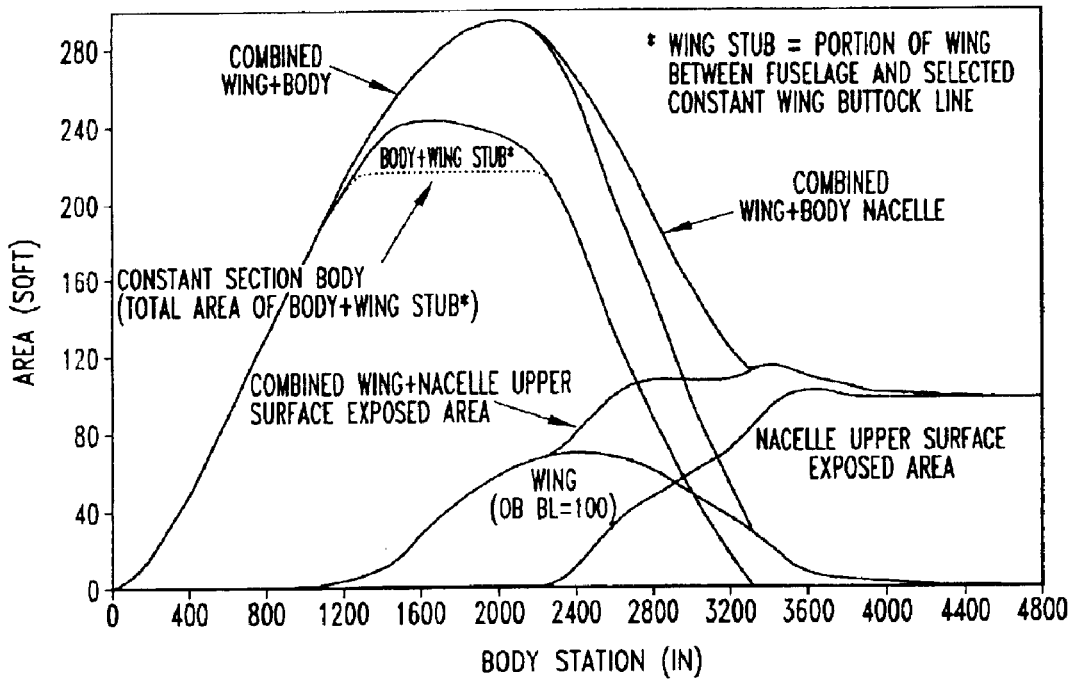
FIG. 6A is a plot illustrating the total cross-sectional area and cross-sectional area of selected components of an aircraft having an integrated propulsion system in accordance with an embodiment of the invention.

FIG. 6A illustrates an example of an area distribution corresponding to a configuration in accordance with an embodiment of the invention. The area distribution of the combined wing and body, and (toward the aft portion of the aircraft), the combined wing, body and nacelle, form a smoothly varying function that can significantly reduce the impact of wave drag at near-sonic and supersonic speeds.

Figure 6B:
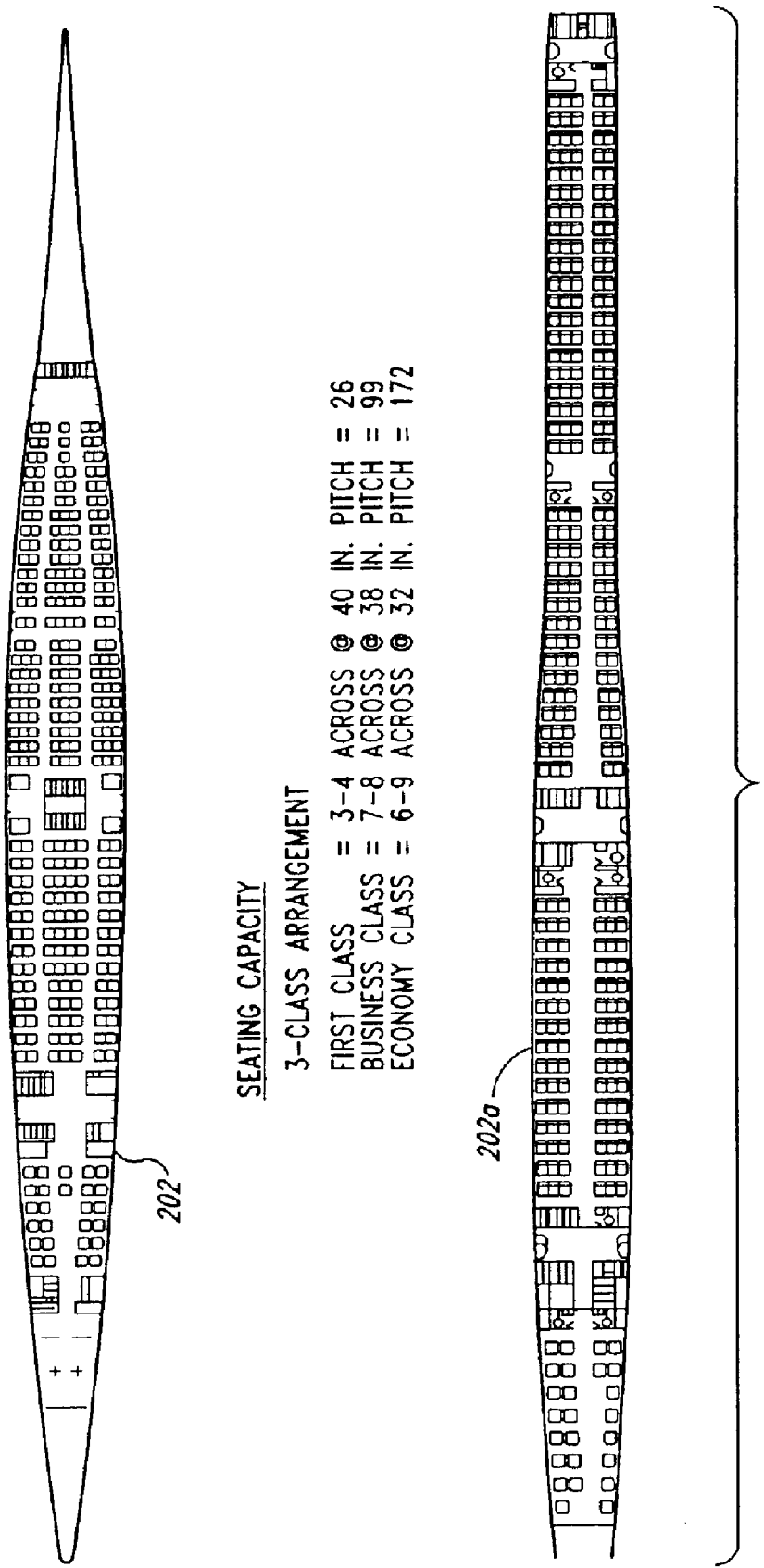
FIG. 6B illustrates a comparison of waisted and non-waisted fuselage configurations in accordance with an embodiment of the invention.
Figure 6C:
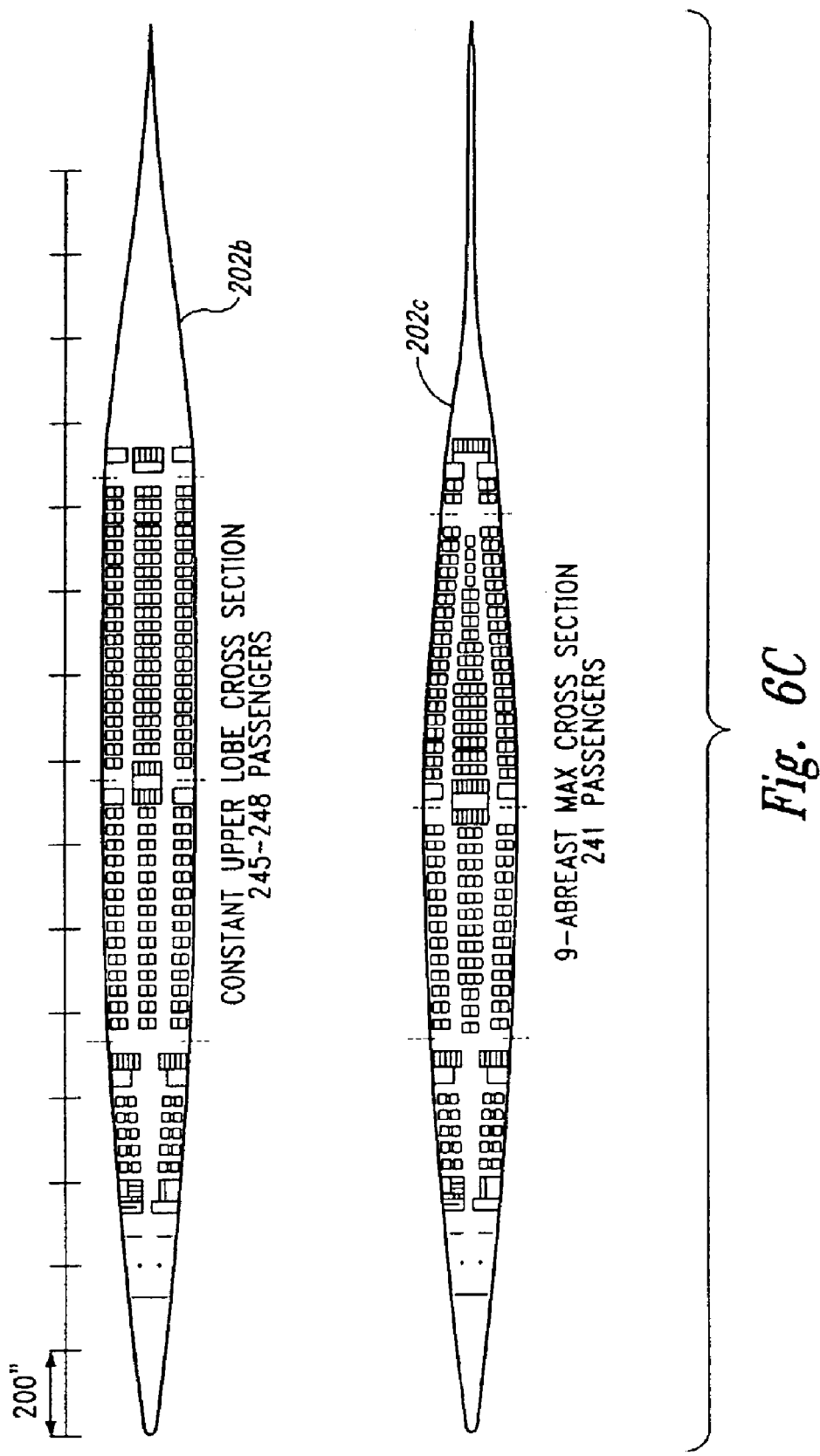
FIG. 6C illustrates alternative non-waisted passenger seating arrangements in accordance with other embodiments of the invention.

FIG. 6B illustrates a seating arrangement for the fuselage 202 in accordance with an embodiment of the invention. For purposes of comparison, FIG. 6B also illustrates a fuselage 202a having approximately the same seating capacity but in a waisted configuration. FIG. 6C illustrates two further embodiments of fuselages 202b and 202c having non-waisted configurations.

Returning now to FIG. 4A, the aft body 214 of the aircraft 200 can include flat regions or "beaver tails" 240 inboard of each exhaust nozzle 222. The flat regions 240 can provide structural support for the nacelles 218 and can form an integral horizontal stabilizer. The flat regions 240 can be integrated with the aft body 214 and can generate a portion of the total airplane lift, which can react against a portion of the static weight and inertial load of the engines 216. The aft body 214 can further include movable elevator surfaces 242 that can be used in combination with outboard wing elevons 244 and the canards 228 to provide longitudinal (i.e., pitch axis) trim and control functions.

In one aspect of this embodiment, the use of three surfaces (the elevators 242, the elevons 244 and the canards 228) can allow operation over a wide range of center-of-gravity conditions that can otherwise be difficult or impracticable to accommodate on configurations having large, heavy engines mounted toward the rear of the aircraft. In a further aspect of this embodiment, the canards 228, the elevons 244 and the elevators 242 can be simultaneously deflected to produce lift on all three surfaces and lift the center of gravity of the aircraft 200. In another embodiment, the elevators 242 can be integrated with the exhaust nozzles 222 to provide for thrust vectoring, described in greater detail below with reference to FIGS. 10 and 11A–C. In yet another embodiment, the canards 228 can be eliminated, for example, when the elevons 244 and the elevators 242 produce adequate pitch control. Such a configuration may be suitable for an aircraft configured as a tanker, a bomber, a business jet or another aircraft type for which the shift of the center of gravity during flight or between flights is limited.

In one aspect of an embodiment of the aircraft 200, the tails 230 can be vertical and can be mounted on the same structural members that support the engines 216, at approximately the same buttockline as the engines 216. Accordingly, the overall weight of the aircraft 200 can be reduced when compared with configurations having separate support structures for the engines and the tails. Alternatively, a single tail can be mounted directly to the fuselage 202 proximate to the aft body 214. In either embodiment, the tails 230 can be all-moving, or alternatively, the tails 230 can include a fixed portion with a moveable rudder.

One feature of an embodiment of the aircraft 200 described above with reference to FIGS. 2–6C is that by integrating the propulsion system 206 with the aft body 214, the effect on the cross-sectional area of the fuselage 202 can be reduced when compared with other engine installation configurations. Accordingly, the fuselage 202 need not be narrowed at its center, which can have an adverse effect on payload capacity, structural characteristics and sonic boom characteristics.

Figure 7:
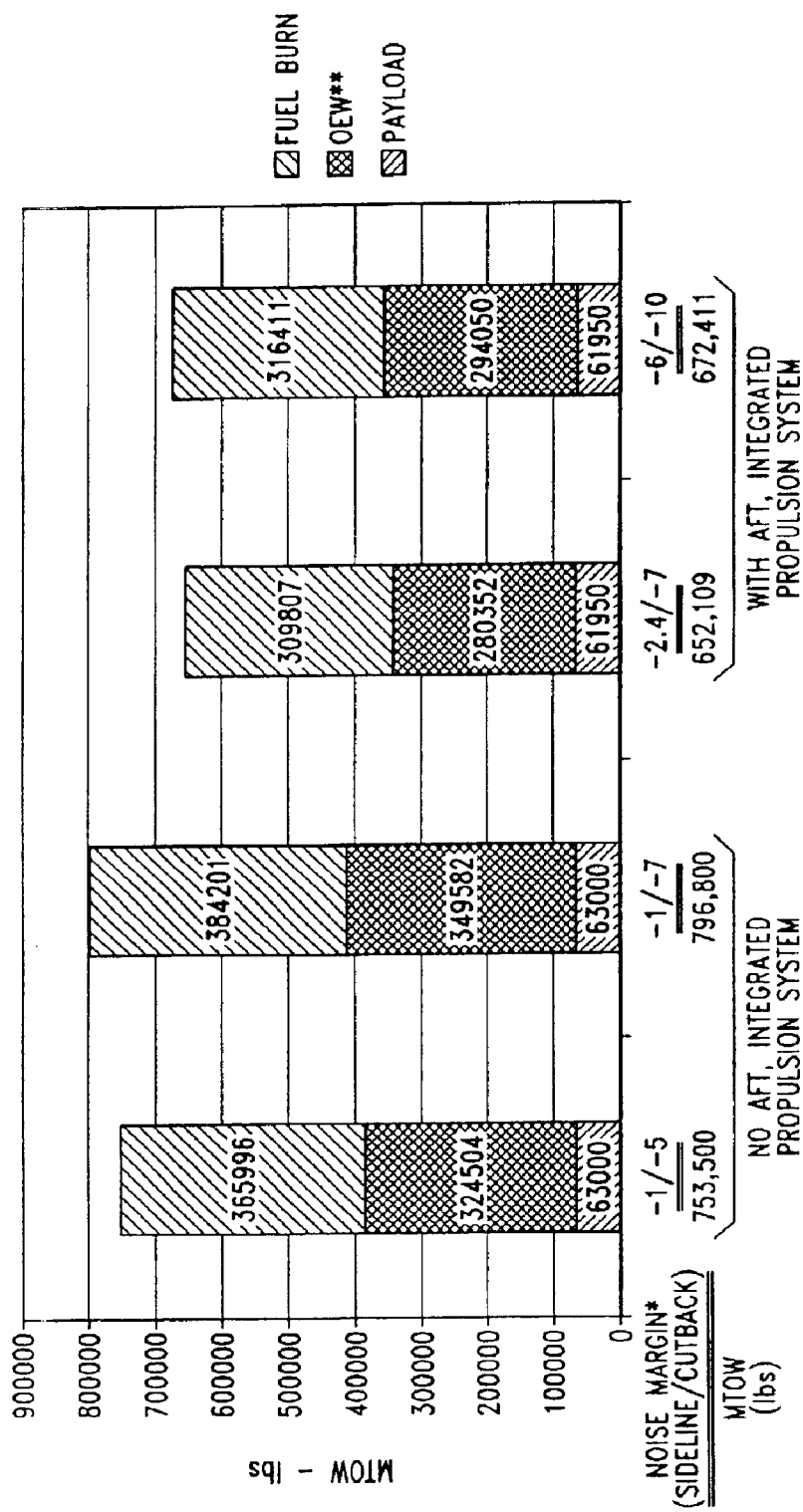
FIG. 7 illustrates a comparison of predicted take-off gross weights and noise levels corresponding to aircraft in accordance with embodiments of the invention.

Another advantage of an embodiment of the aircraft 200 described above with reference to FIGS. 2–6C is that the overall length of the propulsion system 206 can be increased relative to other configurations, without adversely affecting the area ruling described above and without substantially increasing the cantilever loads aft of the wing trailing edge 224. Accordingly, both the inlets 220 and the nozzles 222 can be treated with acoustic panels or other noise-reduction devices to reduce the environmental impact of noise generated by the aircraft 200. For example, FIG. 7 illustrates predicted data for aircraft of the type described above with reference to FIGS. 2–6C, comparing noise levels for aircraft with and without aft-mounted integrated propulsion systems. Both aircraft are configured to carry 300 passengers for 5,500 nautical miles at approximately the same supersonic cruise Mach number. As shown in FIG. 7, an aircraft having no aft-mounted, integrated propulsion system increases in maximum take-off weight from 753,500 pounds to 796,800 pounds when the noise level at throttle cutback (after takeoff) is reduced from 5 dB to 7 dB below FAR Part 36 Stage III noise rules. Conversely, an aircraft having an aft-mounted, integrated propulsion system increases in weight from 652,109 pounds to 672,411 pounds to reach a noise level of 10 dB below the noise rules at cutback, and 6 dB below the noise rules for sideline (end of runway at takeoff) noise levels. Accordingly, an aircraft having an integrated propulsion configuration in accordance with an embodiment of the invention (a) can have a lower take-off gross weight than other configurations, and (b) can be more robust than other configurations from a noise standpoint because noise levels can be reduced by a greater margin without resulting in as great an increase in aircraft weight.

Still another feature of an embodiment of the aircraft 200 described above with reference to FIGS. 2–6C is that at least a portion of the nacelle 218 is "hidden" behind the projected frontal area of the wing 204 and integrated with the wing 204. Accordingly, the aircraft 200 can accommodate engines 216 having a larger diameter (for higher thrust and/or a higher engine bypass ratio) than non-integrated configurations, without a significant aerodynamic penalty. Furthermore, integrating the nacelles 218 can reduce the exposed wetted area of the nacelles 218 and accordingly, the overall skin friction of the aircraft. Still further, the S-shape of the inlet duct 221 can shield the region external to the aircraft from forward-propagating noise generated by the engine fan and/or other engine components.

Another feature of integrating the nacelle 218 with the aircraft wing 204 and aft body 214 is that this arrangement can more efficiently support the engines 216. For example, the engines 216 need not be cantilevered or suspended beneath the wing 204, and the nozzle 222 can be integrated with the aft body 214, rather than being cantilevered behind the wing 204. As described above, one advantage of this feature is that the nozzle 222 can be made longer (allowing for increased acoustic treatment) without substantially increasing the structural loads generated by the nozzle. For example, in one embodiment, the nozzle 222 can be lengthened by about 150 inches compared to arrangements having underslung wing-mounted nacelles.

Still another feature of an embodiment of the aircraft 200 described above with reference to FIGS. 2–6C is that it can include a flat pitch control region or "beaver tail" 240 at the aft body 214. One advantage of the flat region 240 is that it can increase the overall chord length of the inboard wing, thereby reducing the thickness-to-hord ratio (and accordingly, reducing drag), or allowing for an increased wing box depth. Another advantage is that the flat portion 240 can distribute a portion of the aerodynamic lift over the aft body and thereby reduce the wing box structural load. Still another advantage of the aft flat region 240 is that it can, in combination with a delta wing planform shape, reduce or delay high angle of attack pitch-up instability problems when compared to other configurations lacking this feature.

Yet another feature of an embodiment of the aircraft 200 described above with reference to FIGS. 2–6C is that the delta wing planform shape can create sufficient lift to reduce or eliminate the need for lift enhancing devices, such as leading and/or trailing edge slotted and/or unslotted flaps. Accordingly, the mechanical complexity of the wing can be reduced when compared with conventional configurations.

Still another feature of an embodiment of the aircraft described above with reference to FIGS. 2–6C is that the fuselage 202 need not be waisted or reduced in cross-sectional area to accommodate the presence of the wing 204 and/or the propulsion system 206. Accordingly, a shorter, larger diameter fuselage can be used to enclose the same number of passenger seats. The shorter fuselage can reduce the overall weight of the aircraft and can improve the ride quality of the aircraft, compared with aircraft having longer (and more flexible) fuselages.

In other embodiments, the aircraft 200 can have features different than those described above with reference to FIGS. 2–6C. For example, the inlet aperture 223 can have a generally elliptical shape (as shown in FIG. 4B) or, alternatively, the inlet aperture 223 can have other shapes and configurations, such as those described in greater detail below with reference to FIGS. 20A–20G. In some embodiments, it may be advantageous to reduce the height-to-width ratio of the inlet aperture 223 so as to more completely integrate the inlet with the aircraft. Each inlet 220 can provide air to a single engine, or alternatively, each inlet 220 can provide air to multiple engines, as described in greater detail below with reference to FIG. 10. The inlets 220 can have moveable internal surfaces for supersonic applications or, alternatively, the inlets can have a fixed geometry, for example, when installed in subsonic aircraft, such as those described below with reference to FIGS. 12–17A.

The exhaust nozzle 222 can have an ejector-suppressor configuration with fixed or variable geometry, and can have a generally round, rectangular or other shape. In one embodiment, the nozzle 222 can include a jet blade ejector nozzle configured for increased noise suppression and described in greater detail in pending U.S. application Ser. No. 09/671,870, filed Sep. 27, 2000, and incorporated herein in its entirety by reference. In other embodiments, the nozzle 222 can provide thrust vectoring, as described in greater detail below with reference to FIGS. 10 and 11A–C. In one embodiment, the wing can have a leading edge sweep angle of from about 28 degrees to about 38 degrees outboard of the nacelles 218 and a sweep angle of from about 45 degrees to about 75 degrees or more inboard of the nacelles 218. In other embodiments, the wing sweep can have other values.

Figure 8:
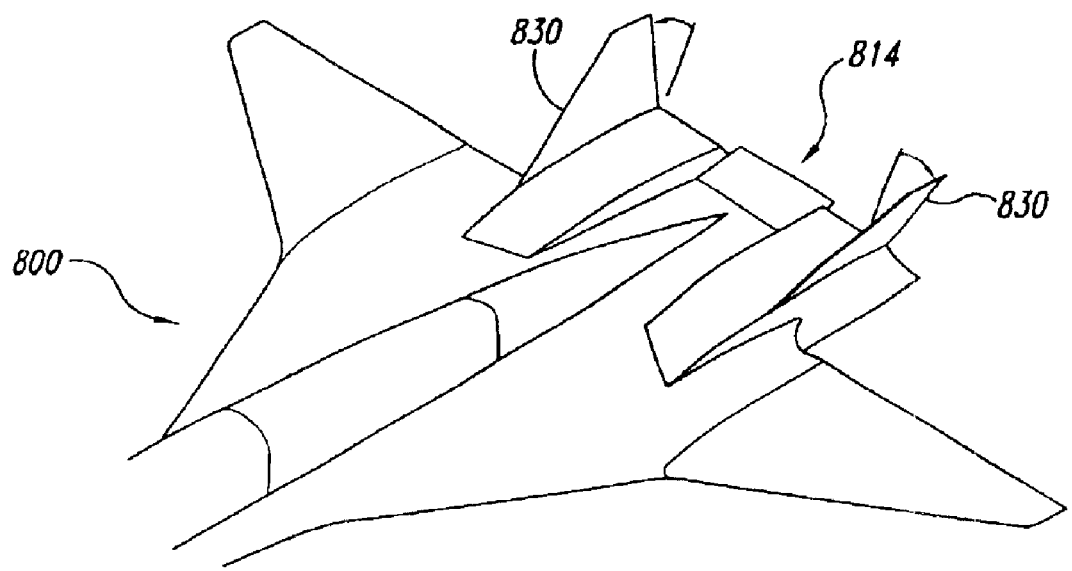
FIG. 8 is a partially schematic, top isometric view of an aft portion of a high-speed aircraft configuration having outwardly canted tails in accordance with an embodiment of the invention.
Figure 9:
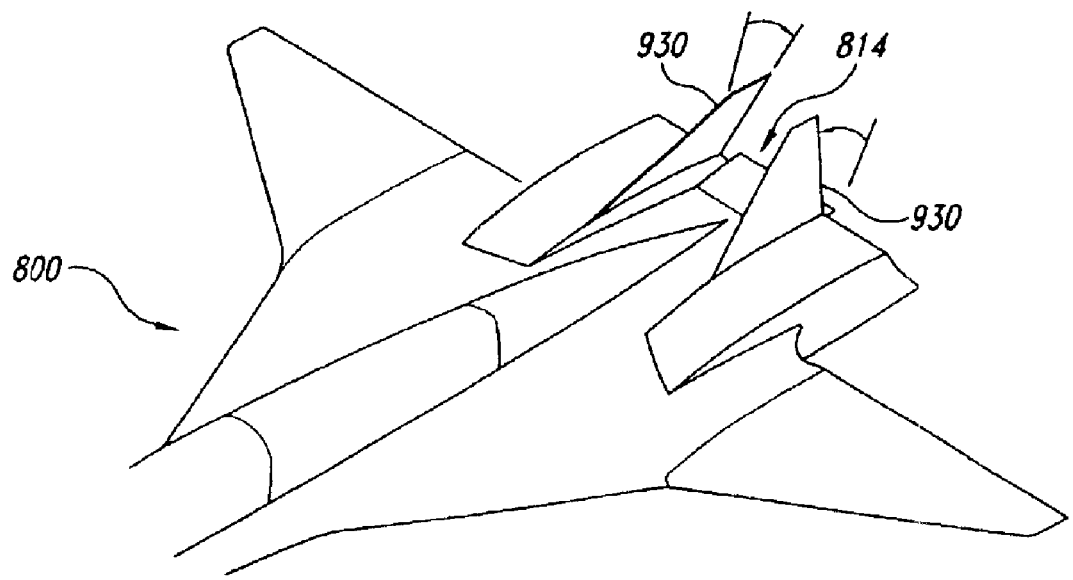
FIG. 9 is a partially schematic, top isometric view of an aft portion of a high-speed aircraft configuration having inwardly canted tails in accordance with an embodiment of the invention.

In still further embodiments, the aircraft can have still further configurations. For example, as shown in FIG. 8, an aircraft 800 in accordance with an embodiment of the invention can have an integrated aft body 814 generally similar to the aft body 214 described above with reference to FIGS. 2–6C. The aircraft 800 can also include tails 830 that are canted outwardly. Alternatively, as shown in FIG. 9, the aircraft 800 can include an aft body 814 having inwardly canted tails 930. The particular configuration chosen for the tails can depend upon the aerodynamic and control characteristics of other features of the aircraft.

Figure 10:
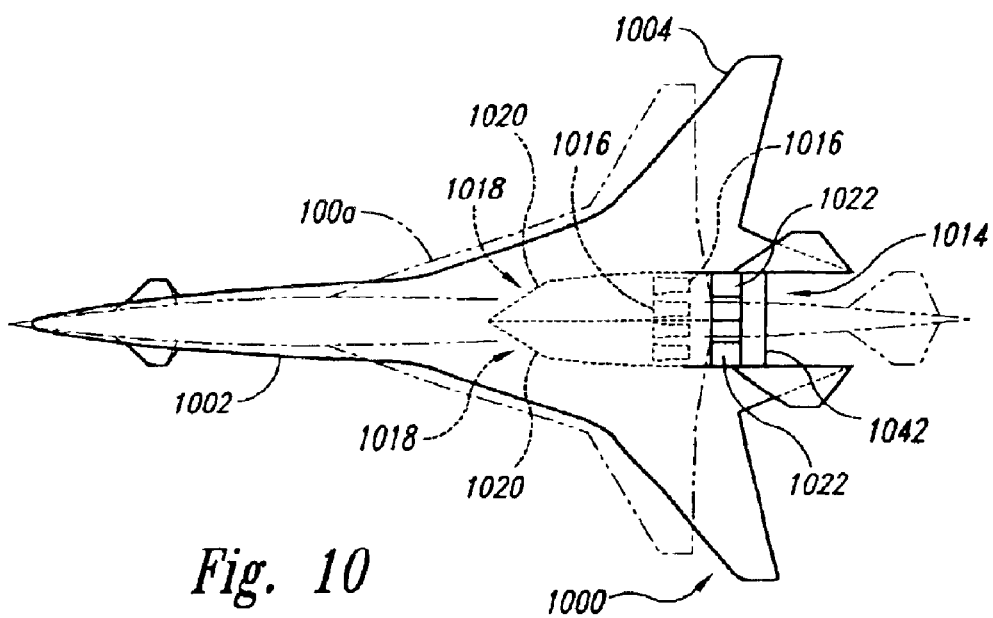
FIG. 10 is a partially schematic, top plan view of a high-speed transport aircraft having an integrated aft-mounted propulsion system in accordance with another embodiment of the invention, superimposed on an aircraft having a non-integrated propulsion system.
Figure 11A:
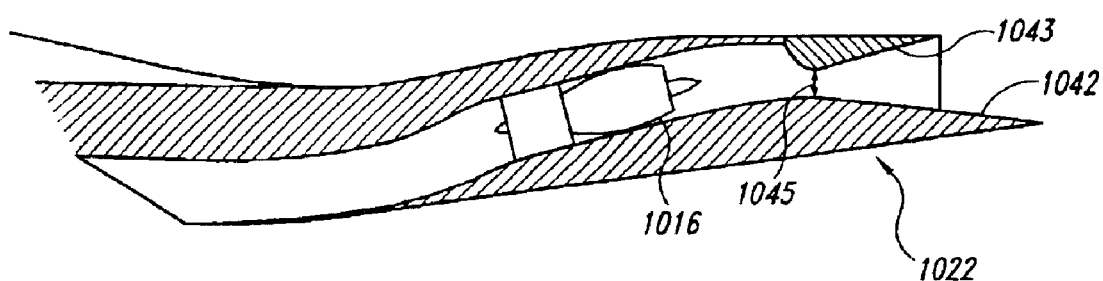
FIGS. 11A–C are partially schematic, cross-sectional side elevational views of a high-speed aircraft aft body and nozzle in accordance with another embodiment of the invention.
Figure 11B:
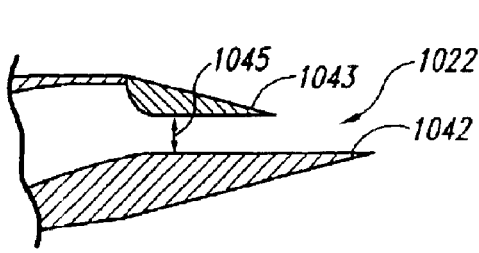
Figure 11C:
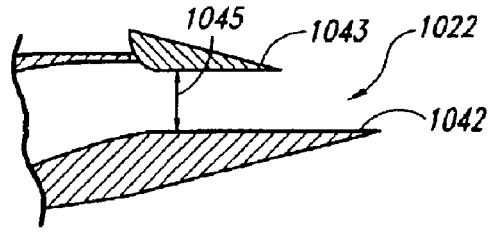

FIG. 10 is a partially schematic top plan view of an aircraft 1000 having integrated nacelles 1018 and an aft body 1014 in accordance with another embodiment of the invention. For purposes of illustration, the plan view of the aircraft 1000 is superimposed on a plan view of an aircraft 100a (generally similar to that shown in FIG. 1A) having a nonintegrated propulsion system. In one aspect of the embodiment shown in FIG. 10, the aircraft 1000 can include a fuselage 1002, a wing 1004, and two nacelles 1018, with each nacelle 1018 having an inlet 1020 mounted beneath the fuselage 1002 and/or the wing 1004. Each inlet 1020 can provide air to two engines 1016. In a further aspect of this embodiment, the aircraft 1000 can include nozzles 1022 proximate to an upper surface of the aft body 1014. Elevons 1042 are positioned at the aft portion of the nozzles 1022 to vector the thrust produced by the engines 1016. For example, as shown in a partially schematic cross-sectional view in FIG. 11A, an elevon 1042 can be positioned directly aft of the engine 1016 and beneath an upstream nozzle upper flap 1043. The positions of the elevon 1042 and upper flap 1043 can be adjusted to control the area of an upstream nozzle throat 1045, depending upon the speed of the aircraft. The setting shown in FIG. 11A can correspond to a typical supersonic cruise condition. The setting shown in FIG. 11C can correspond to a typical subsonic cruise condition (with optional ejector flow), and the setting shown in FIG. 11B can correspond to a typical take-off condition. In other embodiments, the nozzle 1022 can have other vectoring configurations. For example, the upper flap 1043 can be extended aft to provide additional thrust vectoring. In another alternate configuration, thrust vectoring can be provided in the yaw and/or roll directions, as well as in the pitch plane.

Figure 12:
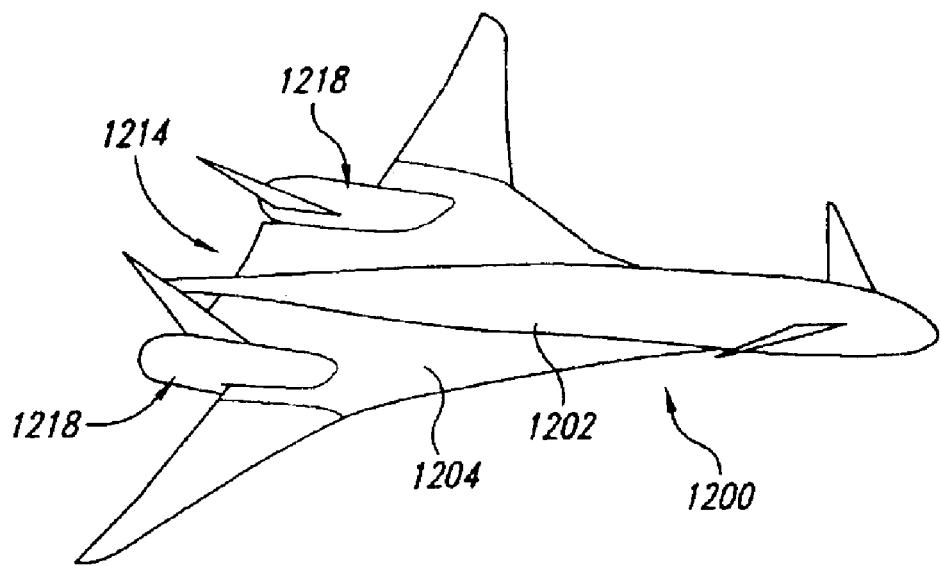
FIG. 12 is a partially schematic, front right isometric view of a near-sonic transport aircraft in accordance with an embodiment of the invention.
Figure 13:
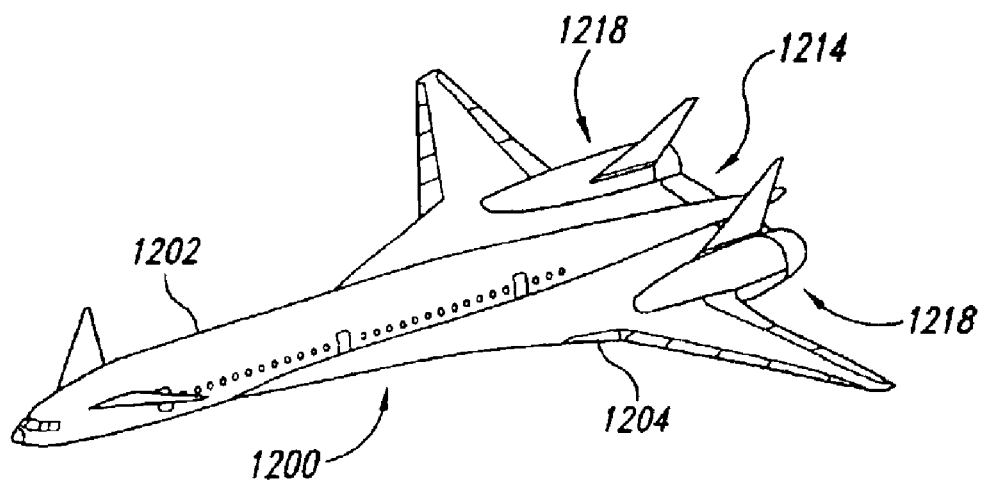
FIG. 13 is a partially schematic, front left isometric view of the near-sonic transport aircraft shown in FIG. 12 in accordance with an embodiment of the invention.

FIG. 12 is a partially schematic, front right isometric view of a near-sonic aircraft 1200 having an aft-mounted, integrated propulsion system in accordance with another embodiment of the invention. FIG. 13 illustrates a left front side isometric view of the aircraft shown in FIG. 12. FIG. 14 is a table of dimensional data representative of an embodiment of the aircraft 1200 shown in FIGS. 12 and 13. FIGS. 15A–C illustrate a plan view, side view and front view, respectively, of an embodiment of the aircraft 1200 generally similar to that shown in FIGS. 12 and 13. Referring now to FIGS. 12–15C, the aircraft 1200 can include a fuselage 1202, a wing 1204 and nacelles 1218 integrated with an aft body 1214 in a manner generally similar to that described above with reference to FIGS. 2–6C. Accordingly, (referring now to FIG. 15C), each nacelle 1218 can include an inlet 1220 having an inlet aperture 1223 mounted beneath the wing 1204, an engine 1216 aft of the inlet 1220, and an exhaust nozzle 1222 that extends above an upper surface 1238 of the wing. The aircraft 1200 can further include tails 1230 that are canted slightly inwardly, as shown in FIG. 15B. Alternatively, the tails can be canted outwardly or positioned vertically in other embodiments. The aircraft 1200 can further include canards 1228 that, in cooperation with elevators 1242 and elevons 1244, can control the pitch attitude of the aircraft in a manner generally similar to that described above with reference to FIGS. 2–6C.

Figure 15D:
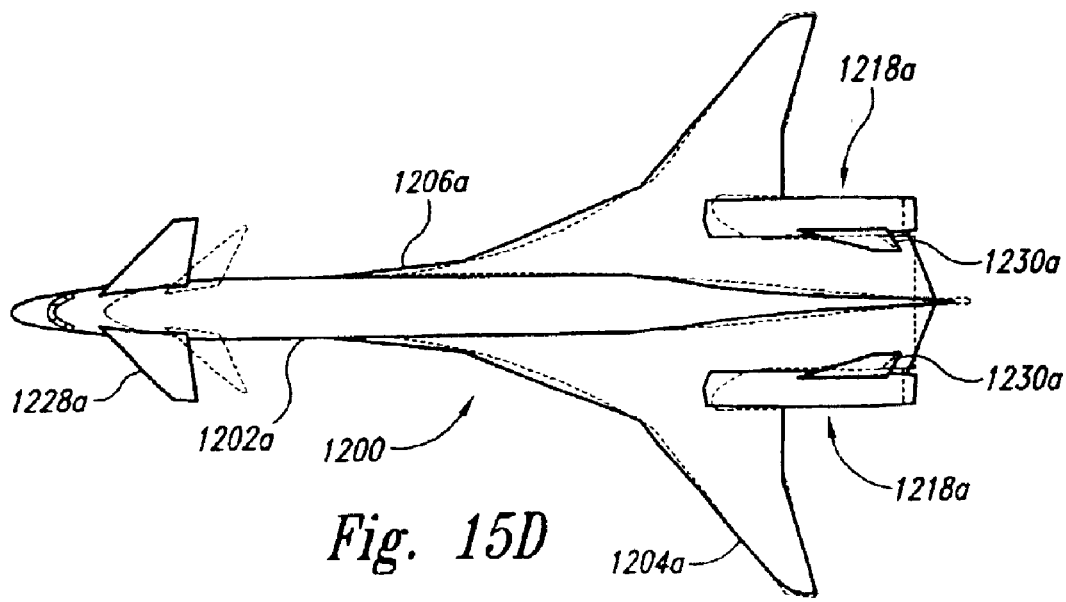
FIGS. 15D–F are partially schematic top, front, and side views of a near-sonic transport aircraft in accordance with another embodiment of the invention.
Figure 15E:
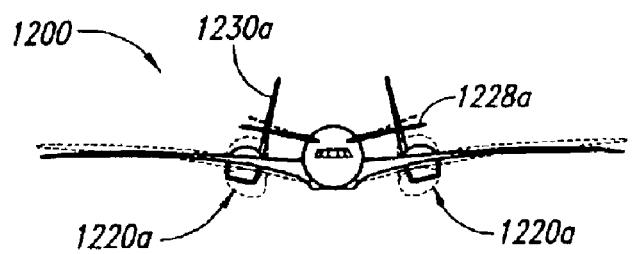
Figure 15F:
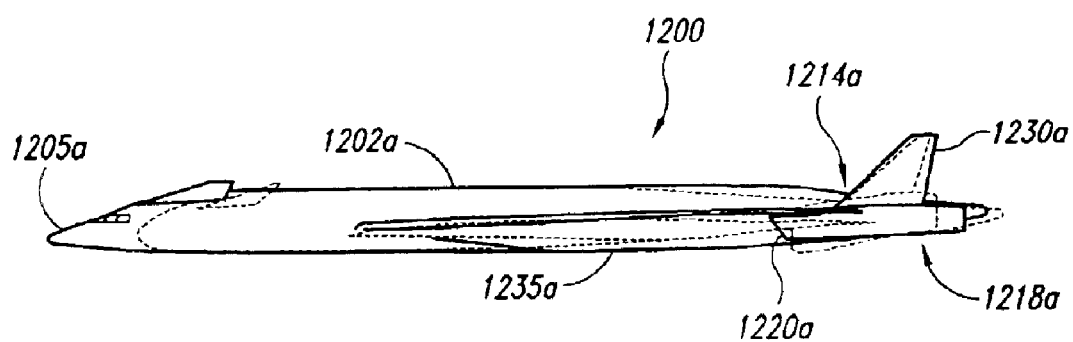
Figure 16A:
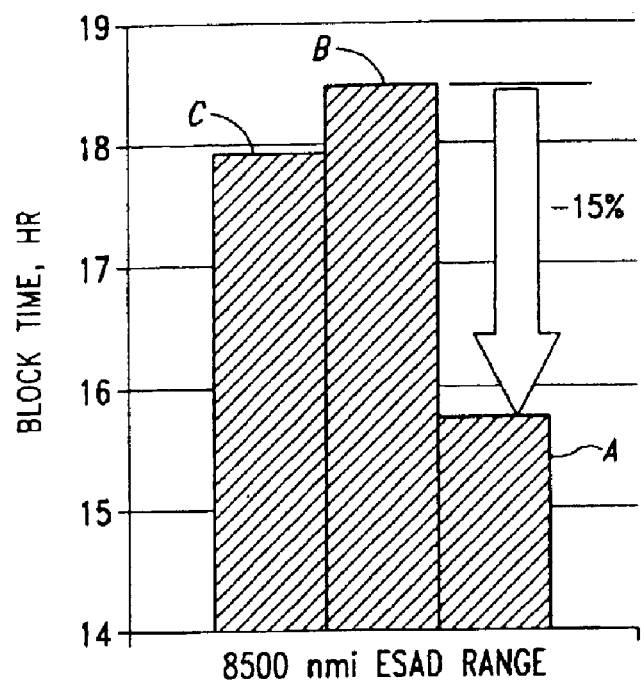
FIG. 16A illustrates data comparing predicted block times for conventional subsonic aircraft and a near-sonic transport aircraft in accordance with an embodiment of the invention.

FIGS. 15D–F illustrate top, front, and side views, respectively, of a near-sonic aircraft 1200 having some features that differ from those shown in FIGS. 15A–C. The configuration of FIGS. 15A–C is shown in dashed lines in FIGS. 15D–F for purposes of comparison. The aircraft 1200 shown in FIGS. 15D–F can have a fuselage 1202a that is lengthened relative to the fuselage 1202 shown in FIGS. 15A–C. In one aspect of this embodiment, the fuselage 1202a can have a constant cross-sectional area plug to achieve the increased length. The aircraft 1200 shown in FIGS. 15D–F can include inlets 1220a that are swept in side view and more rectangular than the inlets 1220, and nacelles 1218a that are lengthened relative to the nacelles 1218 to accommodate mixed-flow nozzles. An aft body 1214a of the aircraft 1200 can have a slight inflection and can be smoothly and continuously blended with a landing gear fairing 1235a. The wing 1204a can have a slightly different tip shape, and can include strakes 1206a that are more highly swept and shorter in a span-wise direction than the corresponding portions of the wing 1204 shown in FIGS. 15A–C. The aircraft 1200 shown in FIGS. 15D–F can include a nose 1205a that is more drooped and pointier than the corresponding structure shown in FIGS. 15A–C. The canard 1228a and tails 1230a shown in FIGS. 15D–F can have a lower sweep angle, lower aspect ratio, and larger size when compared to the corresponding structures shown in FIGS. 15A–C. In other embodiments, the aircraft 1200 can have features and elements with other sizes, shapes and configurations.

In one aspect of the embodiments shown in FIGS. 12–15F, the aircraft 1200 can have a cruise speed of near-sonic velocities. For example, the cruise speed can be from about Mach 0.85 to about Mach 0.99 in one embodiment and, in one specific aspect of this embodiment, the cruise speed can be from Mach 0.95 to 0.98. The aircraft 1200 can have a length of about 250 feet and can be configured to carry from about 210 to about 260 passengers over a range of from about 5,000 nautical miles to about 11,000 nautical miles. In other embodiments, the aircraft 1200 can have a length of up to 350 feet or more to carry up to 500 or more passengers over the same range. In still further embodiments, the aircraft can have a shorter range, for example, from about 2,000 nautical miles to about 5,000 nautical miles.

In one embodiment, the near-sonic aircraft 1200 can include many of the features described above with reference to the supersonic aircraft 200. Accordingly, the aircraft 1200 can realize many or all of the benefits described above with reference to FIGS. 2–6C. For example, the fuselage 1202 of the aircraft can be tapered at its aft region to provide for a uniform overall area distribution, when combined with the integrated aft body 1214. The nacelles 1218 and the engines 1216 can be at least partially hidden by the wing 1204, as described above. The aft integration of the engines 1216 can provide for more efficient structural support of the nacelles 1218 and increased inlet and nozzle duct lengths, which can accommodate increased noise treatment. The nacelles 1218 can accommodate engines 1216 having bypass ratios greater than 1.0, for example, from about 5 to about 7 or 9, or other bypass ratios typical of subsonic cruise transport aircraft. The engines 1216 can produce thrust levels that are dependent on the aircraft configuration. For example, the thrust levels can be from about 75,000 pounds to abut 100,000 pounds in one embodiment. As described above with reference to FIGS. 2–6C, the aerodynamic fineness ratio of the inboard wing can be improved (or the wing box depth increased) and high lift systems, such as complex leading and trailing edge flap and slot systems can be reduced and/or eliminated. The delta wing 1204 and the aft body 1214 can be integrated to reduce or delay high angle of attack pitch-up instability problems.

Still a further advantage of embodiments of the aircraft 1200 described above with reference to FIGS. 12–15F is that it can be more efficient and economical than conventional subsonic transports. For example, FIG. 16A graphically illustrates the range and block time for a configuration in accordance with an embodiment of the invention, compared with two conventional configurations. As used herein, block time refers to the time interval between the removal of wheel blocks prior to aircraft pushback for take-off, and the placement of blocks after landing. FIG. 16A compares the predicted block time for an 8,500 nautical mile trip performed by an aircraft in accordance with an embodiment of the invention (indicated by letter "A"), relative to two conventional subsonic transport aircraft (labeled "B" and "C"). Predictions for an aircraft in accordance with an embodiment of the invention indicate up to a 15% reduction in block time when compared to conventional, subsonic cruise transport aircraft. In other embodiments, the reduction can have other values. In either embodiment, the reduction can translate to a proportional decrease in cash airplane-related operating costs (CAROC) such as crew costs, fuel costs, etc.

Figure 16B:
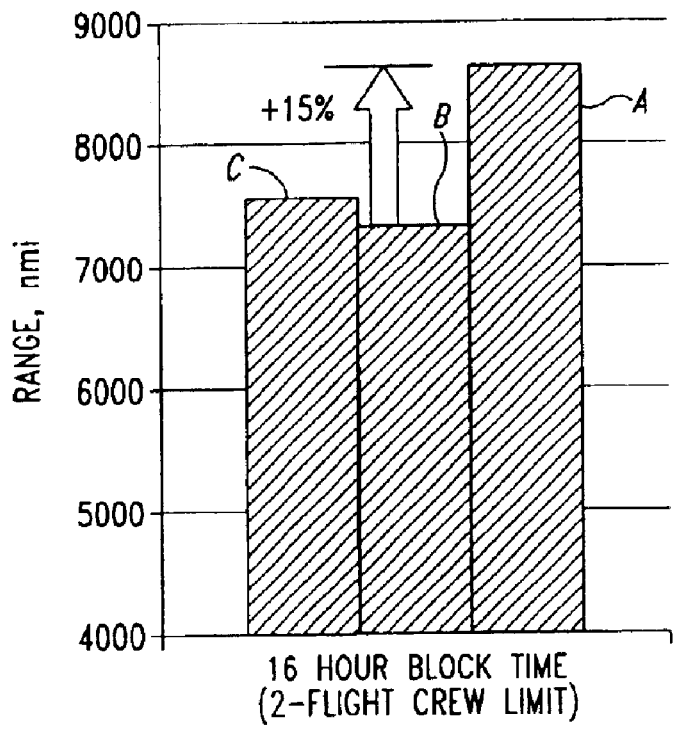
FIG. 16B illustrates data comparing predicted ranges for conventional subsonic aircraft and a near-sonic transport aircraft in accordance with an embodiment of the invention.

FIG. 16B illustrates the predicted range (indicated by letter "A") of an aircraft in accordance with an embodiment of the invention, compared to the range for two conventional subsonic transport aircraft (indicated by letters "B" and "C"). As shown in FIG. 16B, for a fixed 16-hour block time, an aircraft in accordance with an embodiment of the invention can have a range of up to 15% greater than conventional subsonic transport aircraft. In alternate embodiments, the aircraft can have other ranges. For example, in one embodiment, the aircraft can be configured to transport from about 200 to about 300 passengers up to about 11,000 nautical miles. An advantage of such a configuration is that the aircraft can fly anywhere in the world, non-stop, in less than 20 hours flying time.

Figure 17A:
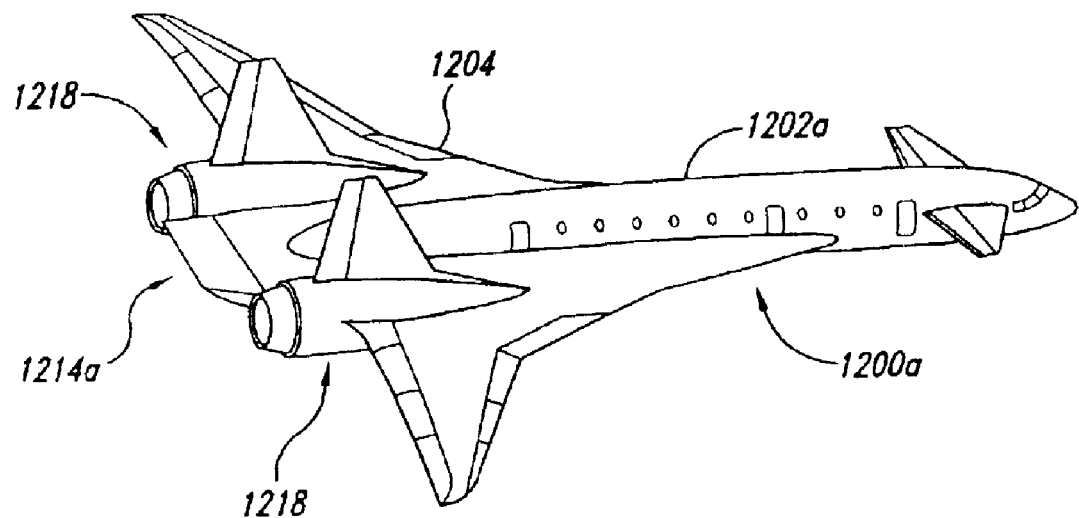
FIG. 17A is a partially schematic, isometric view of a near-sonic aircraft in accordance with another embodiment of the invention.
Figure 17B:
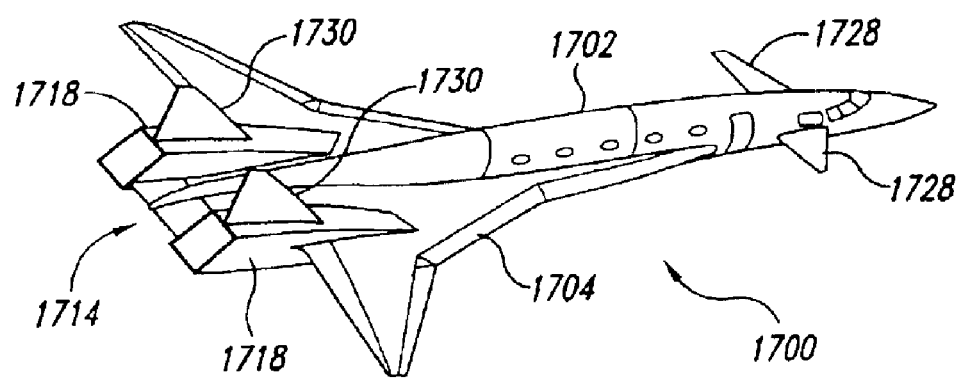
FIG. 17B is a partially schematic rear isometric view of a supersonic business jet having a propulsion system integrated with an aft body in accordance with an embodiment of the invention.

In still further embodiments, an aircraft having an aft-mounted, integrated propulsion system can have other configurations. For example, FIG. 17A illustrates a right rear isometric view of aircraft 1200a generally similar to the aircraft 1200 described above with reference to FIGS. 12–15C, but having a smaller payload and a fuselage 1202a that terminates forward of the trailing edge of an aft body 1214a. FIG. 17B is a partially schematic rear isometric view of a supersonic business jet 1700 having a fuselage 1702 configured to carry about 10 passengers, a wing 1704, canards 1728, and tails 1730. The aircraft 1700 can further include two engine nacelles 1718, each housing one engine (not visible in FIG. 17B) and integrated into an aft body 1714 in a manner generally similar to that described above with reference to the larger supersonic commercial transports and near-sonic commercial transports. Accordingly, embodiments of smaller aircraft, such as the near-sonic aircraft 1200a and the supersonic business jet 1700 can include many of the features (and can realize all or many of the advantages) described above with reference to the foregoing configurations.

In yet further embodiments, the aircraft can have additional configurations. For example, the aircraft can have any payload capacity ranging from that of a small, medium, or large-sized business jet up to a passenger capacity of 500 seats or more. In other embodiments, the aircraft can be configured for fighter, ground attack, or long-range bombing or reconnaissance missions. The aircraft can have a sustained cruise Mach number of from about 0.9 up to about Mach 2.7 or higher. The aircraft can be configured to include one, two, three, or four primary engines, or other numbers of primary engines in alternate embodiments. As used herein, primary engines are distinguished from auxiliary engines, such as APUs.

Figure 18:
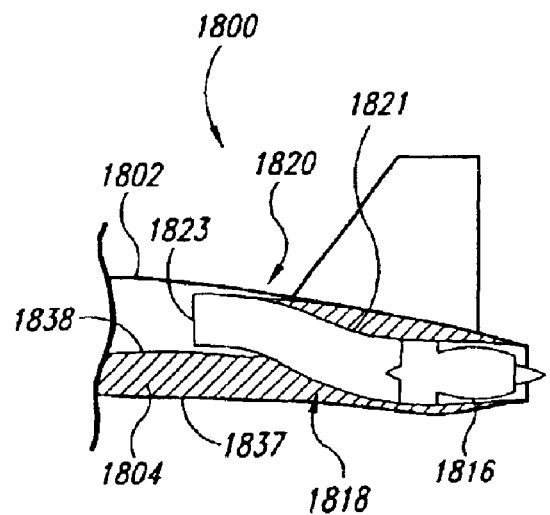
FIG. 18 is a partially schematic illustration of an aft portion of an aircraft having an integrated propulsion system with inlets positioned above the wing in accordance with another embodiment of the invention.

FIG. 18 is a partially schematic, cross-sectional side elevational view of an aft portion of an aircraft 1800 having a fuselage 1802, a wing 1804, and a nacelle 1818 integrated with the wing 1804 in accordance with another embodiment of the invention. In one aspect of this embodiment, the nacelle 1818 includes an inlet 1820 having an inlet aperture 1823 positioned above an upper surface 1838 of the wing 1804. In a further aspect of this embodiment, the inlet aperture 1823 can be offset from the wing upper surface 1838 to reduce the likelihood of ingesting boundary layer air developed over the forward surface of the wing 1804. Alternatively, the inlet aperture 1823 can be mounted flush with the wing upper surface 1838, and the wing upper surface 1838 and/or the inlet 1820 can include a boundary layer control system, such as a bleed system. In either embodiment, the inlet 1820 can further include a generally S-shaped inlet duct 1821 coupling the inlet aperture 1823 with an engine 1816. Accordingly, at least a portion of the engine 1816 can be positioned between the upper surface 1838 and a lower surface 1837 of the wing 1804.

One advantage of mounting the inlet aperture 1823 above the wing 1804 rather than beneath the wing 1804 is that the inlet aperture 1823 can be less likely to ingest foreign matter lofted by the landing gear (not shown in FIG. 18), for example during take-off or landing. Conversely, an advantage of positioning the inlet aperture 1823 beneath the wing lower surface (as described above with reference to FIGS. 2–17B) is that the flow entering the inlet is less likely to be separated from the wing surface at high angles of attack. In either embodiment, positioning the nacelle toward the aft portion of the wing, and at least partially burying the nacelle in the wing can produce all or many of the advantages described above with reference to FIGS. 2–17B. Furthermore, an embodiment of the aircraft 1800 shown in FIG. 18 can include other features described above, such as a non-waisted fuselage, a pitch control surface between the nacelle 1818 and the fuselage 1802, and/or canards.

Figure 19:
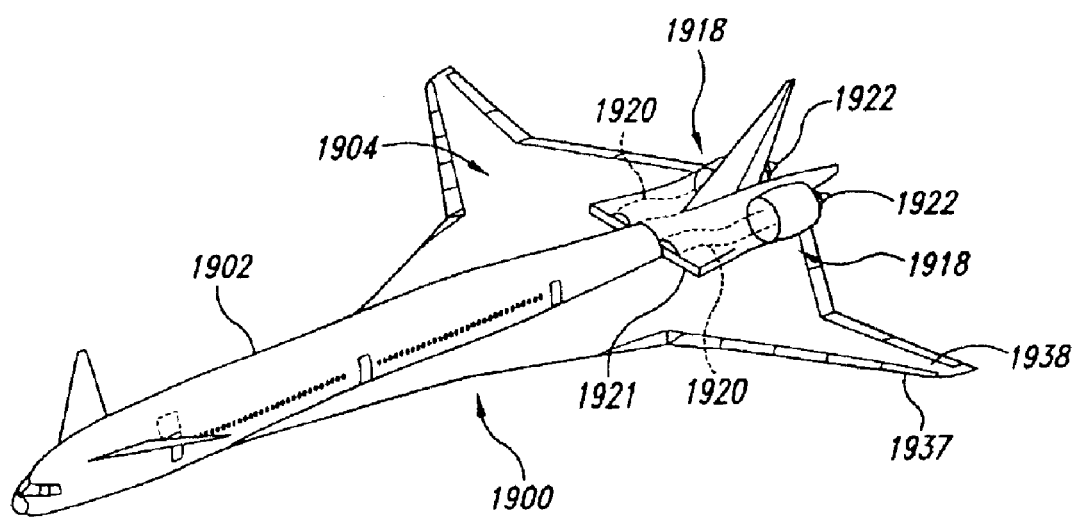
FIG. 19 is a partially schematic, isometric view of a near-sonic transport aircraft having an integrated propulsion system with inlets positioned above the wing in accordance with yet another embodiment of the invention.

In other embodiments, the aircraft can have other inlet-over-wing configurations. For example, as shown in FIG. 19, an aircraft 1900 can include a fuselage 1902, a delta wing 1904 and a pair of nacelles 1918, each having an inlet 1920 mounted proximate to the upper surface 1938 of the wing 1904. The engines (not visible in FIG. 19) and exhaust nozzles 1922 can be positioned at or above the wing upper surface 1938 and/or can extend beneath the wing upper surface 1938 and/or beneath the wing lower surface 1937. Each nacelle 1918 can include an inlet diverter or scoop 1921 to remove boundary layer air developed over the wing 1904 forward of the inlet 1920. In one aspect of this embodiment, the boundary layer air can be directed to one portion of the engine. The inlet 1920 can provide to another portion of the engine air that is generally free of the influences of the boundary layer. In an alternate embodiment, the inlet scoop 1921 can dump the boundary layer air overboard, or can be supplemented with or replaced by an active boundary layer control system that energizes and/or removes the inlet boundary layer upstream of the inlet 1920. In one embodiment, an aircraft having inlets and turbofan engines configured in a manner generally similar to that shown in FIG. 19 can be suitable for cruise Mach numbers of from about 0.95 to about 0.98. Alternatively, an aircraft having such an inlet and turbofan engine configuration and be configured for cruise Mach numbers of about 1.2. In still further embodiments, the aircraft can be configured for other cruise Mach numbers.

Figure 20A:
FIGS. 20A–G are partially schematic illustrations of inlet configurations for near-sonic or supersonic aircraft in accordance with further embodiments of the invention.
Figure 20E:
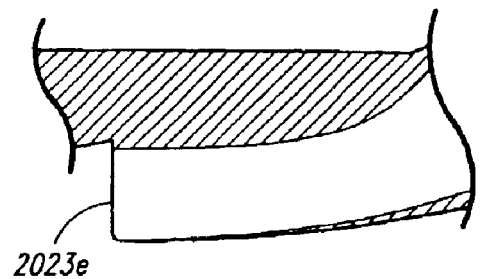
Figure 20B:
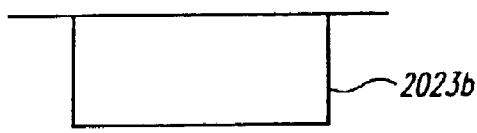
Figure 20F:
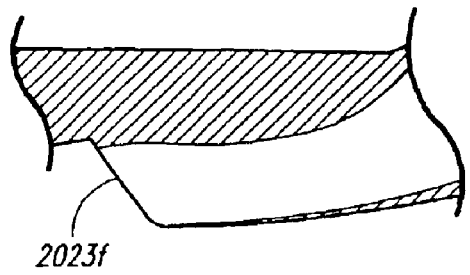
Figure 20C:
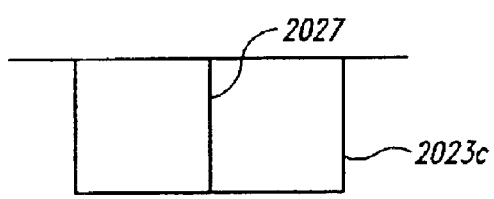
Figure 20D:
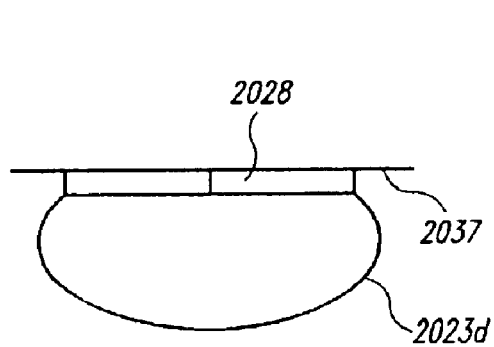

FIGS. 20A–20G are partially schematic illustrations of inlet apertures that may be substituted for any of the inlet apertures described above with reference to FIGS. 2–19 in accordance with further embodiments of the invention. For example, FIG. 20A illustrates a half-round inlet aperture 2023a. FIG. 20B illustrates a rectangular inlet aperture 2023b. FIG. 20C illustrates a rectangular inlet aperture 2023c having a bifurcation 2027 for providing inlet air to a plurality of engines from a single inlet aperture. FIG. 20D illustrates a generally elliptical inlet aperture 2023d offset from a wing lower surface 2037 with a diverter 2028. In other embodiments, aspects of the inlet apertures shown in FIGS. 20A–20D and the foregoing and subsequent Figures can be combined. For example, the elliptical inlet aperture 2023d can include a bifurcation, and/or the rectangular inlet aperture 2023b can include a diverter.

Figure 20G:
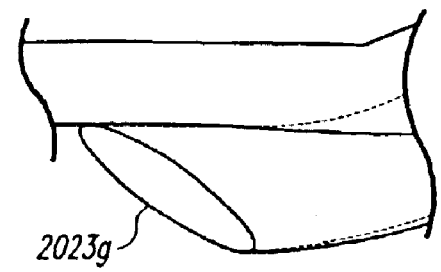

FIG. 20E illustrates an inlet aperture 2023e that is unswept and non-scarfed (e.g., the sidewall edges of the inlet aperture are at least approximately vertical) in accordance with an embodiment of the invention. FIG. 20F illustrates a scarfed inlet aperture 2023f in accordance with another embodiment of the invention. FIG. 20G illustrates an inlet aperture 2023g that is both scarfed and swept. As described above, various aspects of these inlet apertures may be combined in still further embodiments of the invention. The degree to which the inlet ducts in any of the foregoing configurations are curved in an S-shaped manner can vary depending on a variety of factors, such as the landing gear height, the presence or absence of a diverter, the degree of aircraft rotation on takeoff, and/or the point at which the inlet flow will separate from the curved walls of the inlet duct.

Figure 21:
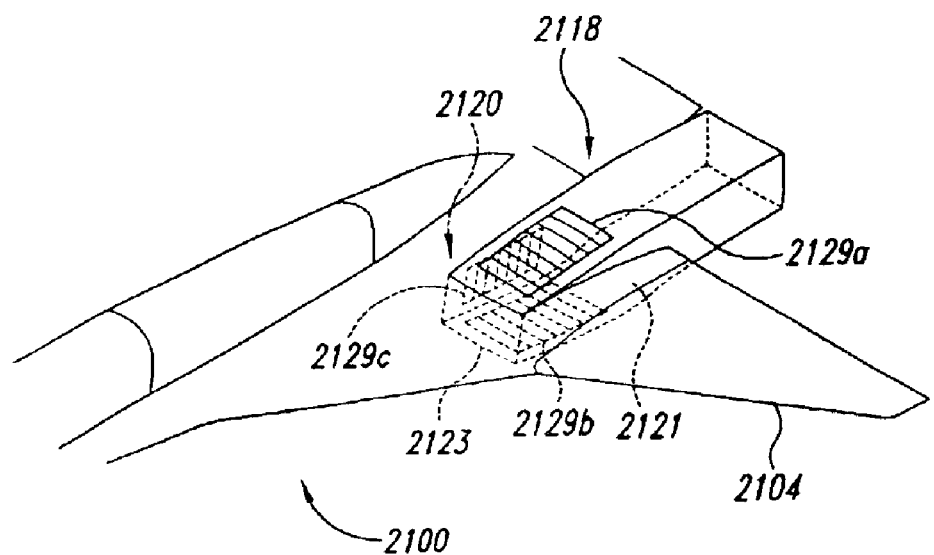
FIG. 21 is a partially schematic, top isometric view of a nacelle integrated with an aircraft aft body and having inlet suck-in doors in accordance with another embodiment of the invention.

FIG. 21 is a partially schematic, isometric view of an aft portion of an aircraft 2100 having a nacelle 2118 in accordance with another embodiment of the invention. In one aspect of this embodiment, the nacelle 2118 can include an inlet 2120 having an inlet aperture 2123 positioned beneath the wing 2104, and a generally S-shaped inlet duct 2121 aft of the inlet aperture 2123, generally similar to the S-ducts described above. In a further aspect of this embodiment, the inlet duct 2121 can include one or more suck-in doors configured to increase air flow to the engine (not shown in FIG. 21) during low-speed, high-thrust operation, such as at take-off. For example, the inlet duct 2121 can include suck-in doors 2129a positioned on an upper surface of the inlet duct 2121 forward of the engine. In another embodiment, the inlet duct 2121 can include suck-in doors 2129b on a lower surface of the inlet duct 2121 in addition to, or in lieu of, the top-mounted suck-in doors 2129a. In still another embodiment, the nacelle 2118 can include suck-in doors 2129c on the inboard side surface of the inlet duct 2121 (as shown in FIG. 21), or on the outboard side surface. In still further embodiments, the nacelle 2118 can include other suck-in door configurations or other inlet airflow augmentation devices.

Figure 22:
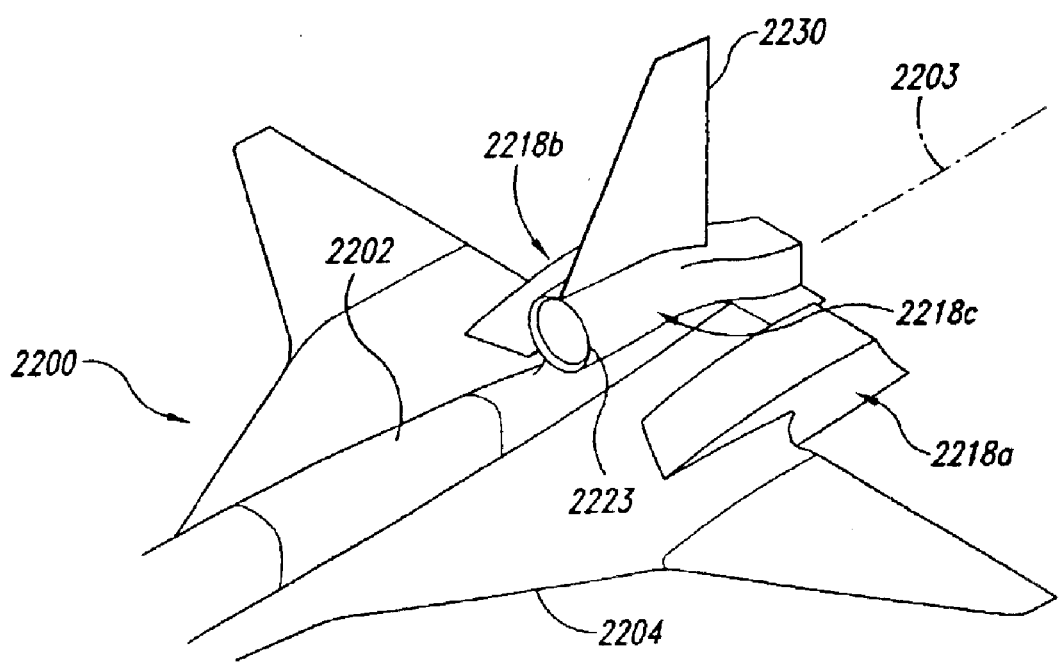
FIG. 22 is a partially schematic, top isometric view of an aircraft aft body configured to include one or three integrated nacelles in accordance with another embodiment of the invention.

FIG. 22 is a partially schematic, isometric view of an aft portion of an aircraft 2200 having a fuselage 2202, a delta wing 2204, and three nacelles 2218 (shown as nacelles 2218a–c) in accordance with an embodiment of the invention. In one aspect of this embodiment, first and second nacelles 2218a and 2218b can be positioned on opposite sides of the fuselage 2202, and a third nacelle 2218c can be positioned between the first and second nacelles 2218a, 2218b in alignment with a fuselage axis 2203. In a further aspect of this embodiment, the third nacelle 2218c can include an inlet aperture 2223 positioned above the fuselage 2202. The inlet aperture 2223 can be mounted flush with the fuselage 2202, or alternatively, the inlet aperture 2223 can be offset from the fuselage 2202 with a diverter, as shown in FIG. 22. In either embodiment, the third nacelle 2218c can have an S-shaped inlet duct to provide air from the inlet aperture 2223 to an engine at least partially buried beneath an upper surface of the wing 2204 and/or the fuselage 2202, in a manner generally similar to that described above with reference to FIG. 18. In a further aspect of this embodiment, the aircraft 2200 can include a single vertical tail 2230. In still another alternate embodiment, the first and second nacelles 2218a, 2218b can be eliminated for a single-engine (or multiengine, single nacelle) configuration. Such a configuration may be suitable for a general aviation aircraft, business jet, fighter, or ground attack aircraft.

Figure 23:
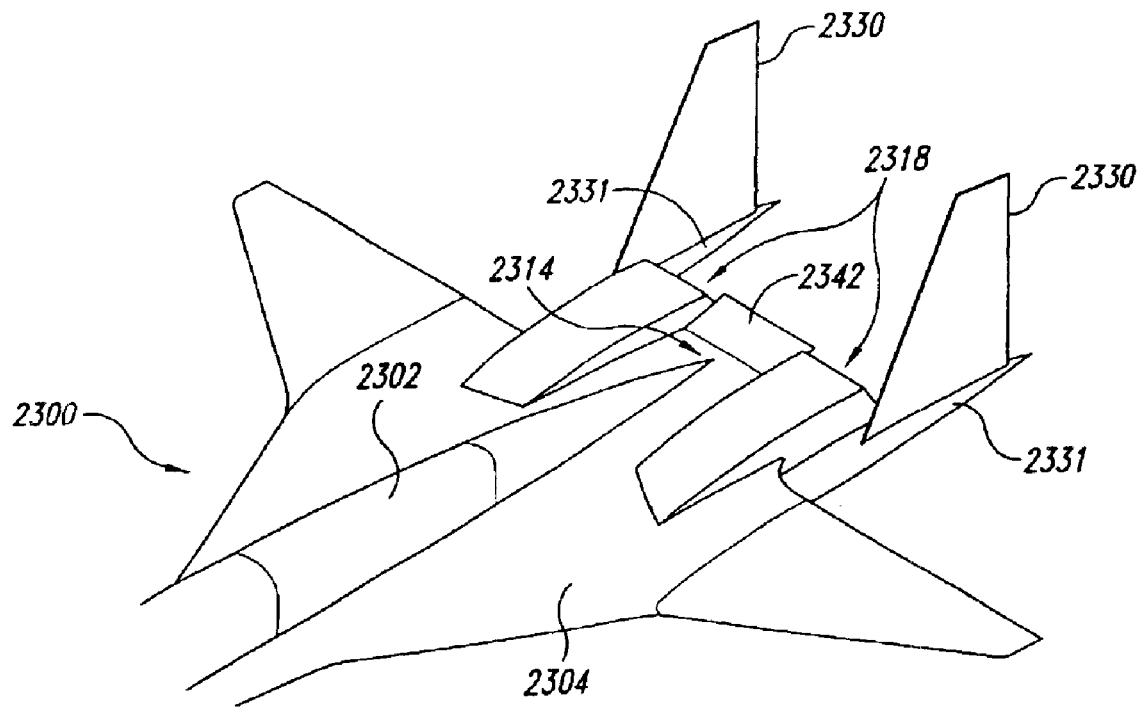
FIG. 23 is a partially schematic, top isometric view of an aircraft aft body having tails mounted on booms in accordance with another embodiment of the invention.
Figure 24:
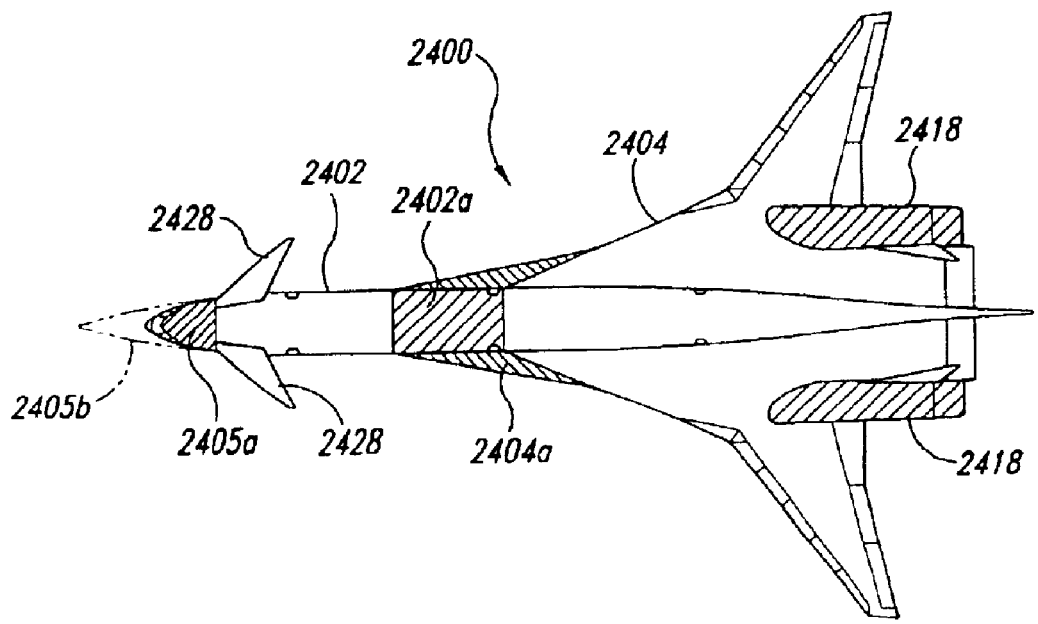
FIG. 24 is a partially schematic, top plan view of a modular aircraft for operation at near-sonic or supersonic cruise Mach numbers in accordance with still another embodiment of the invention.

FIG. 23 is a partially schematic, isometric view of an aft portion of an aircraft 2300 having a fuselage 2302, a delta wing 2304 and an aft body 2314 with elevator surfaces 2342. The aircraft 2300 can further include two nacelles 2318 at least partially buried in the wing 2304, and two vertical tails 2330 positioned on booms 2331 to extend aft of the nacelles 2318, in accordance with an embodiment of the invention. In a further aspect of this embodiment, the booms 2331 can be mounted outboard of the nacelles 2318. Alternatively, the booms 2331 can be mounted inboard of the nacelles 2318 and outboard of the fuselage 2302. An advantage of positioning the vertical tails 2330 aft on the booms 2331 is that they can provide increased control authority by providing a greater moment arm relative to the center of gravity of the aircraft 2300.

In still further embodiments, selected components of the aircraft can have a modular arrangement. For example, selected components of the aircraft can be combined with other components in a manner that depends on whether the aircraft is configured for subsonic or supersonic cruise operation. In one embodiment, the aircraft can have a generally fixed cabin, canard, tail, and inboard wing configuration that is common to both a subsonic and supersonic aircraft. The outboard wing, the nose, and the nacelles can be selected for a given aircraft on the production line (or substituted after the aircraft has been manufactured), depending upon whether the aircraft is intended for subsonic or supersonic cruise. In one embodiment, the division between the inboard and outboard wings can coincide with the location of the nacelle. In other embodiments, the division can have other locations. In either embodiment, an advantage of the modular construction feature is that many components (such as the cabin, canard, tails, and/or inboard wing section) can be common to both subsonic and supersonic aircraft. Accordingly, both subsonic and supersonic aircraft can be more efficiently manufactured and maintained.

FIG. 24 is a partially schematic, plan view of a modular aircraft configuration in accordance with another embodiment of the invention. In one aspect of this embodiment, the aircraft 2400 can include a fuselage 2402, a wing 2404, and canards 2428 configured for both supersonic and near-sonic cruise Mach number operation. The aircraft 2400 can further include interchangeable nacelles 2418, configured for either near-sonic or supersonic cruise Mach number operation. In a further aspect of this embodiment, the aircraft 2400 can include a near-sonic nose portion 2405a attached to the fuselage 2402 when the aircraft is configured for near-sonic cruise Mach number operation, and a supersonic nose portion 2405b attached to the fuselage 2402 when the aircraft 2400 is configured for a supersonic cruise Mach number operation. A wing glove 2404a can be added to the wing 2404 when the aircraft 2400 is configured for supersonic operation. The wing glove 2404a can also be added to the wing 2404 when the near-sonic configuration of the aircraft is lengthened from a baseline configuration, for example when a fuselage plug 2402a is added between forward and aft portions of the fuselage 2402. In other embodiments, the aircraft 2400 can have other modular configurations that take advantage of features common to both the near-sonic and supersonic versions of the aircraft.

From the foregoing, it will be appreciated that, although specific embodiments of the invention have been described herein for purposes of illustration various modifications may be made without deviating from the spirit and scope of the invention. For example, many of the features and components described above in the context of a particular aircraft configuration can be incorporated into other aircraft configurations in accordance with other embodiments of the invention. Accordingly, the invention is not limited except as by the appended claims and/or by claims in applications that claim priority to the present application.

What is claimed is:

1. An aircraft, comprising:
   a fuselage portion configured to carry a payload;
   a wing portion depending from the fuselage portion, the wing portion having a forward region with a leading edge and an aft region with a trailing edge, the wing portion further having an upper surface and a lower surface;
   a propulsion system mounted to the wing portion, the propulsion system having at least one generally fixed inlet aperture projecting upwardly from the wing portion upper surface and aft of the wing leading edge, at least one engine positioned aft of the at least one inlet, and at least one exhaust nozzle aft of the at least one engine, with at least a portion of the engine positioned between the wing portion upper surface and the wing portion lower surface; and
   a canard depending from the fuselage portion.

2. The aircraft of claim 1 wherein the fuselage portion is elongated along a fuselage axis and wherein the propulsion system includes two inlet apertures, at least two engines and two exhaust nozzles, with one inlet aperture, at least one engine and one exhaust nozzle on one side of the fuselage portion and another inlet aperture, at least one other engine and another exhaust nozzle on the other side of the fuselage portion, with the fuselage axis passing between the two engines, and wherein the aircraft further comprises two generally horizontal control surfaces integrated with the aft region of the wing portion with one control surface positioned inboard of one exhaust nozzle and the other control surface positioned inboard of the other exhaust nozzle.

3. The aircraft of claim 1 wherein the propulsion system includes a generally downwardly and rearwardly curving S-shaped duct between the at least one inlet aperture and the at least one engine.

4. The aircraft of claim 1 wherein the wing portion and the propulsion system are configured to operate at at least one sustained cruise Mach number of from about 0.95 to about 0.99.

5. The aircraft of claim 1 wherein the wing portion and the propulsion system are configured to operate at at least one sustained supersonic cruise Mach number of from about 1.5 to about 3.0.

6. The aircraft of claim 1 wherein the wing portion includes a fuel volume configured to carry fuel for the propulsion system, and wherein the engine includes rotating components, further wherein all the rotating components of the engine are positioned aft of the fuel volume.

7. The aircraft of claim 1 wherein the fuselage portion includes a pressurized section, and wherein the engine includes rotating components, further wherein all the rotating components of the engine are positioned aft of the pressurized section of the fuselage portion.

8. The aircraft of claim 1 wherein the combination of the fuselage portion, the wing portion and the propulsion system has a range of from about 2,000 nautical miles to about 11,000 nautical miles.

9. The aircraft of claim 1 wherein the fuselage portion is elongated along a fuselage axis, and wherein the aircraft further comprises:
   a pitch control surface between the at least one exhaust nozzle and the fuselage axis; and
   an elevon at the aft region of the wing portion, and wherein the pitch control surface, the elevon and the canard are movable to control a pitch attitude and/or a lift of the aircraft.

10. An aircraft, comprising:
    a fuselage portion configured to carry a payload;
    a wing portion depending from the fuselage portion, the wing portion having a forward region with a leading edge and an aft region with a trailing edge, the wing portion further having an upper surface and a lower surface;
    a propulsion system mounted to the wing portion the propulsion system having at least one generally fixed inlet aperture projecting upwardly from the wing portion upper surface and aft of the wing leading edge, at least one engine positioned aft of the at least one inlet, and at least one exhaust nozzle aft of the at least one engine, with at least a portion of the engine positioned between the wing portion upper surface and the wing portion lower surface; and
    a generally vertical tail depending from at least one of the fuselage portion and the wing portion.

11. The aircraft of claim 10 wherein the fuselage portion is elongated along a fuselage axis and wherein the propulsion system includes two inlet apertures, at least two engines and two exhaust nozzles, with one inlet aperture, at least one engine and one exhaust nozzle on one side of the fuselage portion and another inlet aperture, at least one other engine and another exhaust nozzle on the other side of the fuselage portion, with the fuselage axis passing between the two engines, and wherein the aircraft further comprises two generally horizontal control surfaces integrated with the aft region of the wing portion with one control surface positioned inboard of one exhaust nozzle and the other control surface positioned inboard of the other exhaust nozzle.

12. The aircraft of claim 10 wherein the propulsion system includes a generally downwardly and rearwardly curving S-shaped duct between the at least one inlet aperture and the at least one engine.

13. The aircraft of claim 10 wherein the wing portion and the propulsion system are configured to operate at at least one sustained cruise Mach number of from about 0.95 to about 0.99.

14. The aircraft of claim 10 wherein the wing portion and the propulsion system are configured to operate at at least one sustained supersonic cruise Mach number of from about 1.5 to about 3.0.

15. The aircraft of claim 10 wherein the wing portion includes a fuel volume configured to carry fuel for the propulsion system, and wherein the engine includes rotating components, further wherein all the rotating components of the engine are positioned aft of the fuel volume.

16. The aircraft of claim 10 wherein the fuselage portion includes a pressurized section, and wherein the engine includes rotating components, further wherein all the rotating components of the engine are positioned aft of the pressurized section of the fuselage portion.

17. The aircraft of claim 10, further comprising a canard depending from the fuselage portion.

18. An aircraft, comprising:
    a fuselage portion configured to carry a payload;
    a wing portion depending from the fuselage portion, the wing portion having a forward region with a leading edge and an aft region with a trailing edge, the wing portion further having an upper surface, a lower surface and a fuel volume; and
    a propulsion system mounted to the wing portion, the propulsion system having at least one generally fixed inlet aperture projecting upwardly from the wing portion upper surface and aft of the wing leading edge, at least one engine positioned aft of the at least one inlet, and at least one exhaust nozzle aft of the at least one engine, with at least a portion of the engine positioned between the wing portion upper surface and the wing portion lower surface, wherein the engine includes rotating components and all rotating components of the engine are positioned aft of the fuel volume.

19. The aircraft of claim 18 wherein the fuselage portion is elongated along a fuselage axis and wherein the propulsion system includes two inlet apertures, at least two engines and two exhaust nozzles, with one inlet aperture, at least one engine and one exhaust nozzle on one side of the fuselage portion and another inlet aperture, at least one other engine and another exhaust nozzle on the other side of the fuselage portion, with the fuselage axis passing between the two engines, and wherein the aircraft further comprises two generally horizontal control surfaces integrated with the aft region of the wing portion with one control surface positioned inboard of one exhaust nozzle and the other control surface positioned inboard of the other exhaust nozzle.

20. The aircraft of claim 18 wherein the propulsion system includes a generally downwardly and rearwardly curving S-shaped duct between the at least one inlet aperture and the at least one engine.

21. The aircraft of claim 18 wherein the wing portion and the propulsion system are configured to operate at at least one sustained cruise Mach number of from about 0.95 to about 0.99.

22. The aircraft of claim 18 wherein the wing portion and the propulsion system are configured to operate at at least one sustained supersonic cruise Mach number of from about 1.5 to about 3.0.

23. The aircraft of claim 18 wherein the fuselage portion includes a pressurized section, and wherein all the rotating components of the engine are positioned aft of the pressurized section of the fuselage portion.

24. The aircraft of claim 18, further comprising a canard depending from the fuselage portion.

25. The aircraft of claim 18, further comprising a generally vertical tail depending from at least one of the fuselage portion and the wing portion.

26. An aircraft, comprising:
 a fuselage portion configured to carry a payload, the fuselage portion including a pressurized section;
 a wing portion depending from the fuselage portion, the wing portion having a forward region with a leading edge and an aft region with a trailing edge, the wing portion further having an upper surface and a lower surface; and
 a propulsion system mounted to the wing portion, the propulsion system having at least one generally fixed inlet aperture projecting upwardly from the wing portion upper surface and aft of the wing leading edge, at least one engine positioned aft of the at least one inlet, and at least one exhaust nozzle aft of the at least one engine, with at least a portion of the engine positioned between the wing portion upper surface and the wing portion lower surface, wherein the engine includes rotating components and all rotating components of the engine are positioned aft of the pressurized section.

27. The aircraft of claim 26 wherein the fuselage portion is elongated along a fuselage axis and wherein the propulsion system includes two inlet apertures, at least two engines and two exhaust nozzles, with one inlet aperture, at least one engine and one exhaust nozzle on one side of the fuselage portion and another inlet aperture, at least one other engine and another exhaust nozzle on the other side of the fuselage portion, with the fuselage axis passing between the two engines, and wherein the aircraft further comprises two generally horizontal control surfaces integrated with the aft region of the wing portion with one control surface positioned inboard of one exhaust nozzle and the other control surface positioned inboard of the other exhaust nozzle.

28. The aircraft of claim 26 wherein the propulsion system includes a generally downwardly and rearwardly curving S-shaped duct between the at least one inlet aperture and the at least one engine.

29. The aircraft of claim 26 wherein the wing portion and the propulsion system are configured to operate at at least one sustained cruise Mach number of from about 0.95 to about 0.99.

30. The aircraft of claim 26 wherein the wing portion and the propulsion system are configured to operate at at least one sustained supersonic cruise Mach number of from about 1.5 to about 3.0.

31. The aircraft of claim 26 wherein the wing portion includes a fuel volume configured to carry fuel for the propulsion system, and wherein all the rotating components of the engine are positioned aft of the fuel volume.

32. The aircraft of claim 26, further comprising a canard depending from the fuselage portion.

33. The aircraft of claim 26, further comprising a generally vertical tail depending from at least one of the fuselage portion and the wing portion.

* * * * *